United States Patent
Saito et al.

(10) Patent No.: US 7,805,389 B2
(45) Date of Patent: Sep. 28, 2010

(54) INFORMATION PROCESSING APPARATUS AND METHOD, PROGRAM AND RECORDING MEDIUM

(75) Inventors: Mari Saito, Kanagawa (JP); Yoshiyuki Kobayashi, Tokyo (JP); Takaomi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 561 days.

(21) Appl. No.: 11/863,055

(22) Filed: Sep. 27, 2007

(65) Prior Publication Data

US 2008/0082506 A1  Apr. 3, 2008

(30) Foreign Application Priority Data

Oct. 2, 2006  (JP)  ............... P2006-270962

(51) Int. Cl.
*G06F 17/00* (2006.01)
*G06N 5/00* (2006.01)

(52) U.S. Cl. ..................... 706/45
(58) Field of Classification Search ............. 706/45
See application file for complete search history.

(56) References Cited

U.S. PATENT DOCUMENTS

| | | | | |
|---|---|---|---|---|
| 5,689,581 A * | 11/1997 | Nakao et al. | ................. | 382/156 |
| 6,115,480 A * | 9/2000 | Washizawa | ................. | 382/103 |
| 6,341,283 B1 * | 1/2002 | Yamakawa et al. | .......... | 707/728 |
| 6,466,692 B1 * | 10/2002 | Washizawa | ................. | 382/156 |
| 6,578,031 B1 * | 6/2003 | Washizawa | ......................... | 1/1 |
| 6,608,929 B1 * | 8/2003 | Shiratani | ..................... | 382/173 |
| 7,130,487 B1 * | 10/2006 | Imagawa et al. | ............ | 382/280 |
| 7,280,961 B1 * | 10/2007 | Bao | ........................... | 704/233 |

(Continued)

FOREIGN PATENT DOCUMENTS

| | | |
|---|---|---|
| JP | 2000-090113 | 3/2000 |
| JP | 2004-171096 | 6/2004 |

OTHER PUBLICATIONS

A Method on Generating Product Feature Trend Map from Press Releases using Syntactic Dependency Analysis with Expression Phrases, Akiyoshi, M.; Shimizu, Y.; Komoda, N.; Systems, Man and Cybernetics, 2006. SMC '06. IEEE International Conference on vol. 4 Digital Object Identifier: 10.1109/ICSMC.2006.384573 Pub Year: 2006, pp. 2988-2992.*

(Continued)

*Primary Examiner*—Michael Holmes
(74) *Attorney, Agent, or Firm*—Finnegan, Henderson, Farabow, Garrett & Dunner, L.L.P.

(57) ABSTRACT

Herein disclosed an information processing apparatus including converting means and retrieval means, wherein the converting means converts content feature quantities using functions adapted to convert a plurality of feature quantities attached to a plurality of pieces of content so that the distance between pieces of content defined by the plurality of feature quantities coincides with the distance suited for a user-entered similarity relationship between the plurality of pieces of content, the functions being further adapted to map the pieces of content laid out in a feature quantity space defined by the plurality of feature quantities into a new feature quantity space by the conversion of the plurality of feature quantities, and wherein the retrieval means retrieves similar pieces of content based on converted feature quantities.

15 Claims, 21 Drawing Sheets

U.S. PATENT DOCUMENTS

| | | | | |
|---|---|---|---|---|
| 7,598,491 | B2 * | 10/2009 | Fukunishi et al. | 250/310 |
| 7,664,608 | B2 * | 2/2010 | Urano et al. | 702/40 |
| 7,688,363 | B2 * | 3/2010 | Sato et al. | 348/240.2 |
| 2004/0128286 | A1 | 7/2004 | Yasushi et al. | |

OTHER PUBLICATIONS

Novel similarity measure for document clustering based on topic phrases, ELdesoky, A.E.; Saleh, M.; Sakr, N.A.; Networking and Media Convergence, 2009. ICNM 2009. International Conference on Digital Object Identifier: 10.1109/ICNM.2009.4907196 Publication Year: 2009, pp. 92-96.*

Intention-based probabilistic phrase spotting for speech understanding, Hofmann, M.; Lang, M.; Intelligent Multimedia, Video and Speech Processing, 2001. Proceedings of 2001 International Symposium on Digital Object Identifier: 10.1109/ISIMP.2001.925341 Publication Year: 2001, pp. 99-102.*

Efficient phrase-based document indexing for Web document clustering, Hammouda, K.M.; Kamel, M.S.; Knowledge and Data Engineering, IEEE Transactions on vol. 16, Issue: 10 Digital Object Identifier: 10.1109/TKDE.2004.58 Publication Year: 2004, pp. 1279-1296.* www.usb.org/developers/wusb/.

* cited by examiner

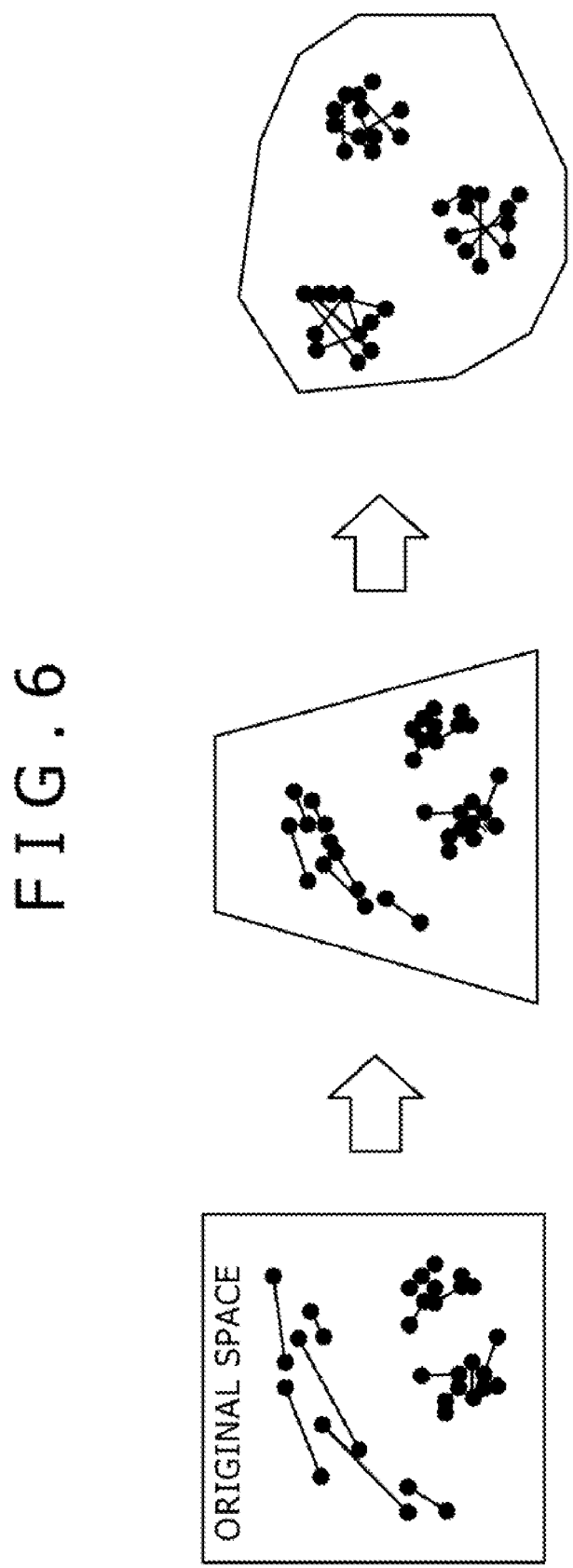

FIG. 7

DIMENSIONS MAKING UP THE FEATURE
QUANTITY SPACE OF ORIGINAL CONTENT=

{TEMPO,SPEED,DISPERSION,MAJOR,NOTES,PITCH MOVE,...,LOMID}

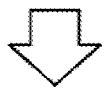 EVOLUTION

EXPANSION  DELETION

DIMENSIONS OF THE
NEXT GENERATION=

{TEMPO,SPEED,DISPERSION* 1.35,MAJOR,NOTES,...,LOMID}

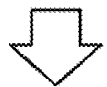 EVOLUTION

NONLINEAR CONVERSION
USING A KERNEL FUNCTION

DIMENSIONS OF THE NEXT
GENERATION AFTER THE NEXT=

{TEMPO,SPEED,DISPERSION* 1.35,K(MAJOR,35),NOTES,...,LOMID}

FIG. 8

PROBABILITY
DISTRIBUTION

EUCLIDEAN DISTANCE BETWEEN PIECES
OF CONTENT IN GENERATED SPACE

FIG.12
$f1(X) = X1*0.5$
$f2(X) = X3*0.4 + X4*0.2$
$f3(X) = \exp(-\text{sqr}(X3-0.5)/0.5*0.6)$
$fm(X) = X4*0.1 + X2*1.5$
FIG.13
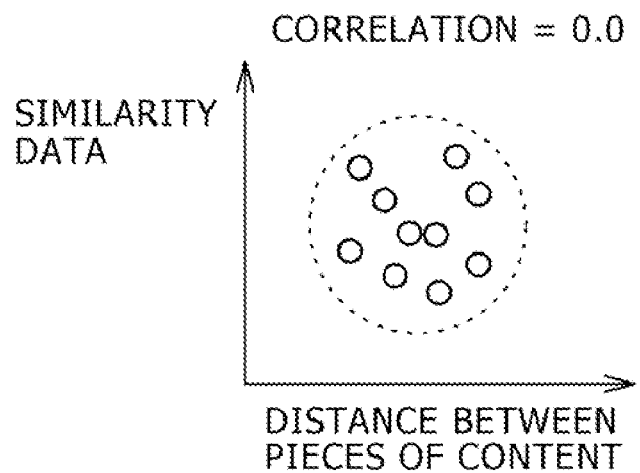
FIG.14
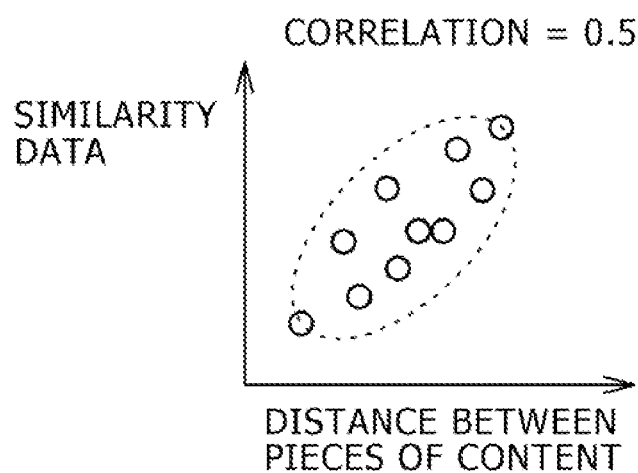

| CLUSTER COUNT | MATCHING RATE WITH EVALUATIONS |
|---|---|
| 1 | 0.45 |
| 2 | 0.48 |
| ⋮ | ⋮ |
| 35 | 0.95 |
| 36 | 0.88 |
| ⋮ | ⋮ |

FIG.17

| CONTENT PAIR | USER EVALUATION |
|---|---|
| CONTENT_A:CONTENT_B | ○ |
| CONTENT_A:CONTENT_C | × |
| CONTENT_A:CONTENT_D | × |
| CONTENT_B:CONTENT_C | × |
| CONTENT_B:CONTENT_D | × |
| CONTENT_C:CONTENT_D | ○ |

FIG. 18

| | CLUSTER COUNT=1 | CLUSTER COUNT=2 | CLUSTER COUNT=3 | CLUSTER COUNT=4 |
|---|---|---|---|---|
| CONTENT_A:CONTENT_B | ○ | ○ | ○ | × |
| CONTENT_A:CONTENT_C | ○ | × | × | × |
| CONTENT_A:CONTENT_D | ○ | × | × | × |
| CONTENT_B:CONTENT_C | ○ | × | × | × |
| CONTENT_B:CONTENT_D | ○ | × | × | × |
| CONTENT_C:CONTENT_D | ○ | ○ | × | × |
| MATCHING RATE | 2/6=33.3% | 6/6=100% | 5/6=83.3% | 4/6=66.6% |

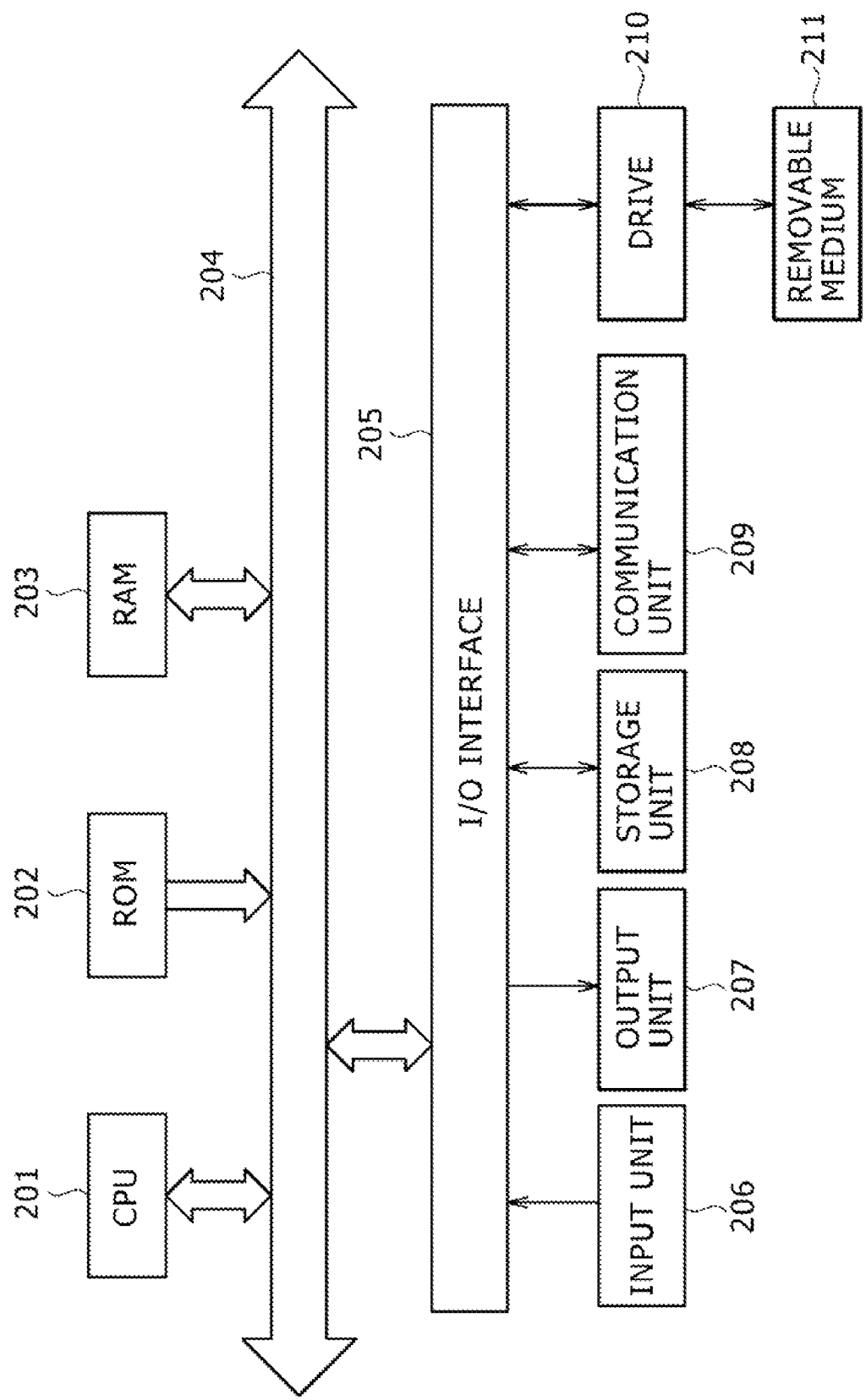

INFORMATION PROCESSING APPARATUS AND METHOD, PROGRAM AND RECORDING MEDIUM

CROSS REFERENCES TO RELATED APPLICATIONS

The present invention contains subject matter related to Japanese Patent Application JP 2006-270962 filed in the Japan Patent Office on Oct. 2, 2006, the entire contents of which being incorporated herein by reference.

BACKGROUND OF THE INVENTION

1. Field of the Invention

The present invention relates to an information processing apparatus and method, a program and a recording medium. The present invention relates, in particular, to an information processing apparatus and method, a program and a recording medium for handling content.

2. Description of the Related Art

Devices that record a large number of musical pieces to a hard disk or flash memory and reproduce the recorded musical pieces are becoming increasingly pervasive. As it becomes possible to record a large number of musical pieces, needs have emerged to retrieve similar musical pieces from among recorded ones.

There are prior art techniques of retrieving similar musical pieces, as by measuring a distance between musical pieces based on their feature quantities (refer, for example, to Japanese Patent Laid-Open No. 2004-171096 as Patent Document 1).

SUMMARY OF THE INVENTION

Normally, however, if similarity is defined based on correlation or distance between feature quantities of musical pieces, this requires as many calculations as there are pairs of musical pieces. Recently, devices have become common which can store several hundreds to over one thousand musical pieces. The more musical pieces, the longer the processing time needed to retrieve similar pieces, thus leading to an enormous processing time.

On the other hand, simply selecting musical pieces having Euclidean distances between feature quantities which are close to each other may result in unintended pieces, namely, those pieces not perceived to be similar by the user, being determined to be similar.

A possible approach to finding, based on Euclidean distance, musical pieces perceived to be similar by the user would be to create a space which properly represents similarity through principal coordinate analysis or incremental update based on similarity between musical pieces obtained from user testing, and then estimate the coordinate of each axis from feature quantities of musical pieces, for example, through regression analysis.

However, it is extremely difficult and not practical to collect a sufficient amount of user test data which represents similarity between musical pieces so that the above methods can be applied. For example, to obtain test data about the degree of similarity among 1450 musical pieces so that principal coordinate analysis can be applied, it is necessary to enter data indicating similarity or dissimilarity for 1450 pieces×1450 pieces or 2.1 million patterns.

The present invention has been accomplished in light of the above, and it is an object of the present invention to identify similar pieces of content in an easier, quicker and more accurate fashion.

An information processing apparatus of an embodiment of the present invention includes converting means and retrieval means. The converting means converts content feature quantities using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. The retrieval means retrieves similar pieces of content based on converted feature quantities.

Extraction means may be further included to extract content feature quantities.

The retrieval means can retrieve similar pieces of content by retrieving pieces of content in the same group among those groups of content whose feature quantities have been converted by the functions.

The converting means can convert content feature quantities by applying the aforementioned functions. The functions are obtained by repeated generation through a genetic method until an evaluation value is no longer updated a predetermined number of generations. The evaluation value is an information criterion calculated from two values. One of them is a value representing the degree of classification based on Euclidean distance between pieces of content considered to be similar and dissimilar in the user-entered similarity relationship between the plurality of pieces of content. The other is the number of free parameters of the functions.

The converting means can convert content feature quantities by applying the aforementioned functions. The functions are obtained by repeated generation through a genetic method until the evaluation value is no longer updated a predetermined number of generations. The evaluation value is calculated from an FDR (Fisher discriminant ratio) which represents the degree of classification.

Generation means may be further included to generate the functions through a generic method so that the converting means can convert content feature quantities by applying the generated functions.

Calculation means may be further included to calculate an evaluation value, which is an information criterion, from two values so that the generation means can generate the functions through a genetic method until the evaluation value is no longer updated a predetermined number of generations. One of the aforementioned two values is a value representing the degree of classification based on Euclidean distance between pieces of content considered to be similar and dissimilar in the user-entered similarity relationship between the plurality of pieces of content. The other is the number of free parameters of the functions.

The calculation means can calculate the evaluation value from an FDR which represents the degree of classification.

Acquisition means may be further included to acquire data representing user-entered similarity relationship between the plurality of pieces of content so that the calculation means can calculate an evaluation value using the data representing user-entered similarity relationship between the plurality of pieces of content.

Clustering means may be further included for performing clustering of content based on converted feature quantities.

Identification means may be further included for identifying a group to which content belongs from a content-to-cluster distance based on converted feature quantities.

An information processing method of an embodiment of the present invention includes the steps of converting and retrieving. The converting step converts content feature quantities using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. The retrieval step retrieves similar pieces of content based on converted feature quantities.

A program of an embodiment of the present invention causes a computer to execute the steps of converting and retrieving. The converting step converts content feature quantities using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. The retrieval step retrieves similar pieces of content based on converted feature quantities.

A program stored in a recording medium of an embodiment of the present invention causes a computer to perform information processing including the steps of converting and retrieving. The converting step converts content feature quantities using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. The retrieval step retrieves similar pieces of content based on converted feature quantities.

In an embodiment of the present invention, content feature quantities are converted using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. Similar pieces of content are retrieved based on converted feature quantities.

As described above, according to an embodiment of the present invention, similar pieces of content can be identified.

Further, according to an embodiment of the present invention, similar pieces of content can be identified in an easier, quicker and more accurate fashion.

BRIEF DESCRIPTION OF THE DRAWINGS

FIG. 6 is a view describing a space modified by a generic method;

FIG. 7 is a view illustrating the concept of space modification by a generic method;

FIG. 8 is a view illustrating the relationship between Euclidean distance and content similarity in a modified space;

FIG. 12 is a view illustrating examples of free parameters;

FIG. 13 is a view illustrating the relationship between a correlation value, similarity data S and distance between content feature quantities;

FIG. 14 is a view illustrating the relationship between the correlation value, the similarity data S and distance between content feature quantities;

FIG. 17 is a view illustrating an example of evaluation using the similarity data S;

FIG. 18 is a view illustrating examples of matching rate;

FIG. 29 is a block diagram illustrating a configuration example of a personal computer.

DETAILED DESCRIPTION OF THE PREFERRED EMBODIMENTS

Before describing the preferred embodiments of the present invention, the relationship between elements of the present invention and the embodiments described herein is discussed below. This description is intended to ensure that the embodiments supporting the claimed invention are described herein. Thus, even if an embodiment is not described as relating to a certain element of the present invention, that does not necessarily mean that the embodiment does not relate to that element of the invention. Conversely, even if an embodiment is described herein as relating to a certain element of the invention, that does not necessarily mean that the embodiment does not relate to other elements of the invention.

Figure 25:
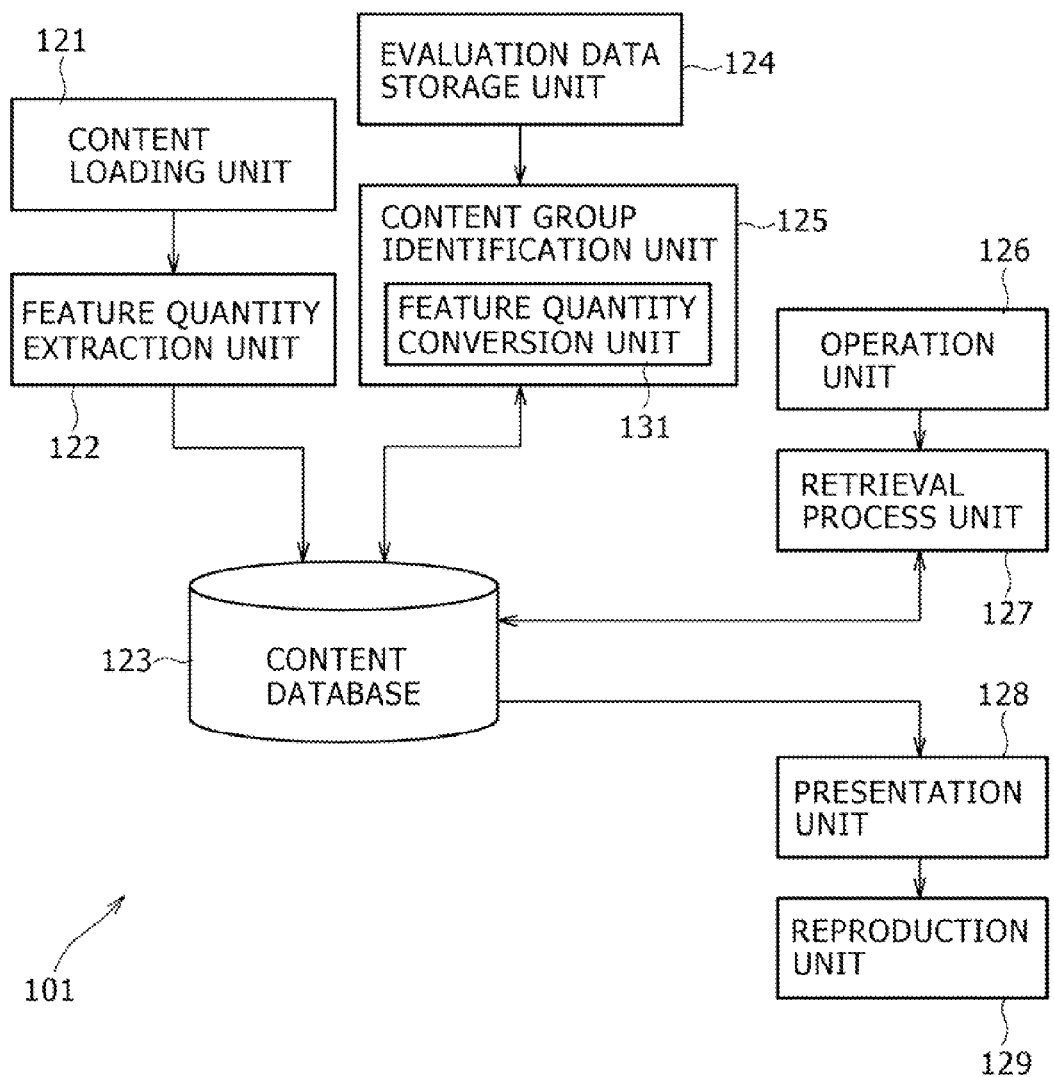
FIG. 25 is a block diagram illustrating a configuration example of an information processing apparatus operable to identify similar pieces of content.

An information processing apparatus of an embodiment of the present invention includes converting means (e.g., a feature quantity conversion unit 131 in FIG. 25) and retrieval means (e.g., a retrieval process unit 127 in FIG. 25). The converting means converts content feature quantities using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. The retrieval means retrieves similar pieces of content based on converted feature quantities.

Extraction means (e.g., a feature quantity extraction unit 122 in FIG. 25) may be further included for extracting content feature quantities.

Generation means (e.g., a space modification unit 26 in FIG. 28) may be further included for generating the functions through a generic method so that the converting means can convert content feature quantities by applying the generated functions.

Figure 2:
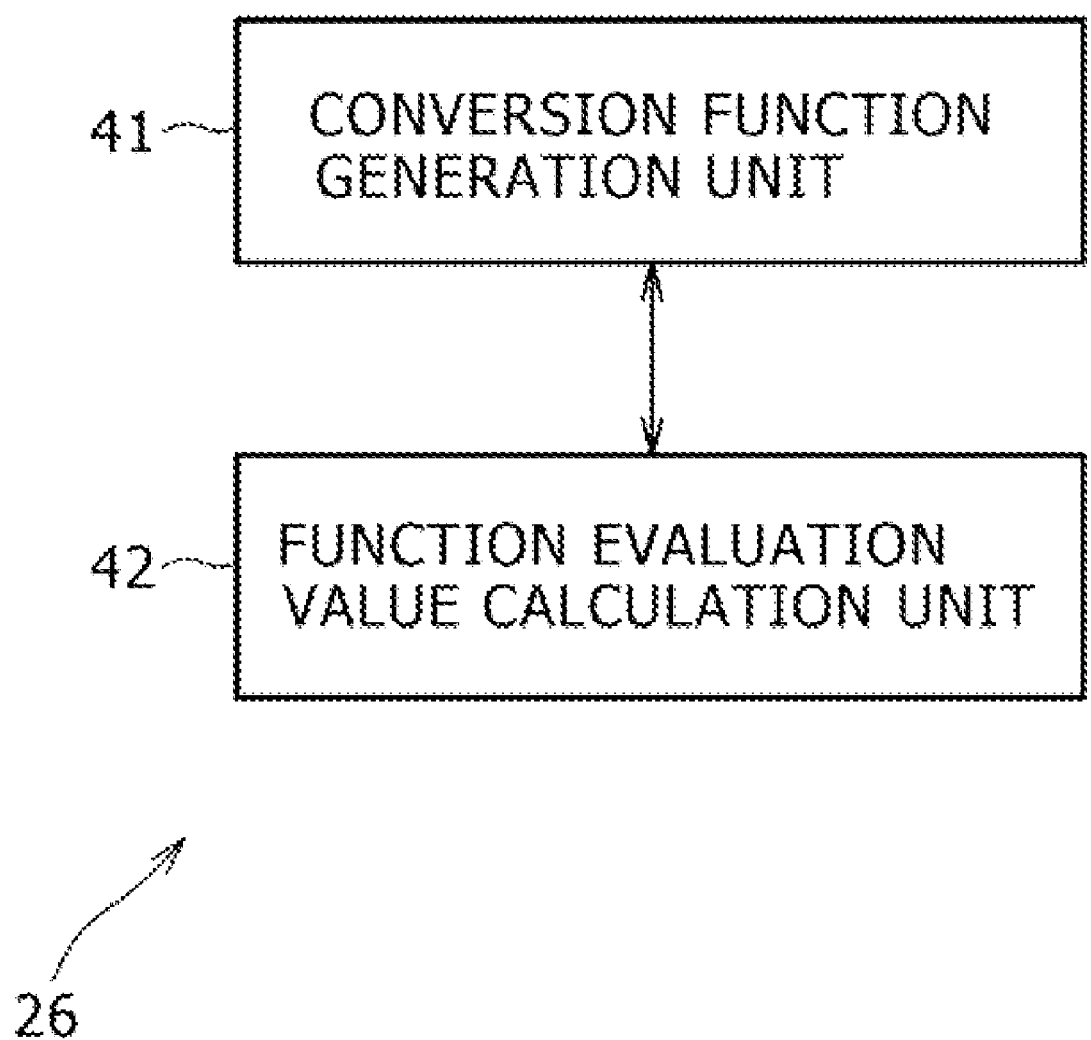
FIG. 2 is a block diagram illustrating an example of a space modification unit.

Calculation means (e.g., a function evaluation value calculation unit 42 in FIG. 2 provided in the space modification unit 26 in FIG. 28) may be further included for calculating an evaluation value, which is an information criterion, from two values so that the generation means can generate the functions through a genetic method until the evaluation value is no longer updated a predetermined number of generations. One of the aforementioned two values is a value representing the degree of classification based on Euclidean distance between pieces of content considered to be similar or dissimilar in the user-entered similarity relationship between the plurality of pieces of content. The other is the number of free parameters of the functions.

Acquisition means (e.g., a user evaluation acquisition unit 25 in FIG. 28) may be further included for acquiring data representing user-entered similarity relationship between the plurality of pieces of content so that the calculation means can calculate an evaluation value using the data representing user-entered similarity relationship between the plurality of pieces of content.

Clustering means (e.g., a clustering unit 27 in FIG. 28) may be further included for performing clustering of content based on converted feature quantities.

Identification means (e.g., a content group identification unit 125 in FIG. 25) may be further included for identifying a group to which content belongs from a content-to-cluster distance based on converted feature quantities.

Figure 26:
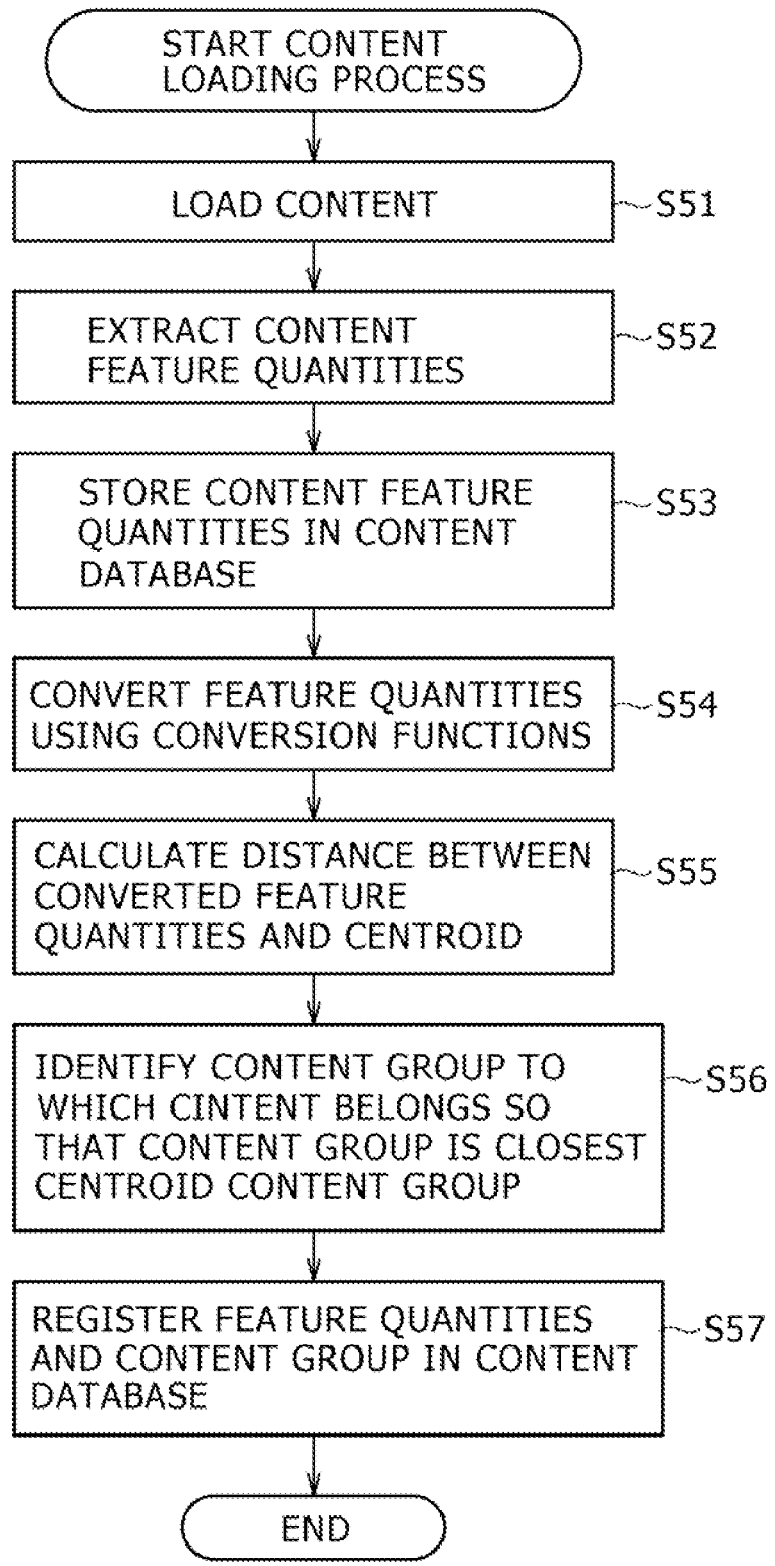
FIG. 26 is a flowchart describing a content loading process.
Figure 27:
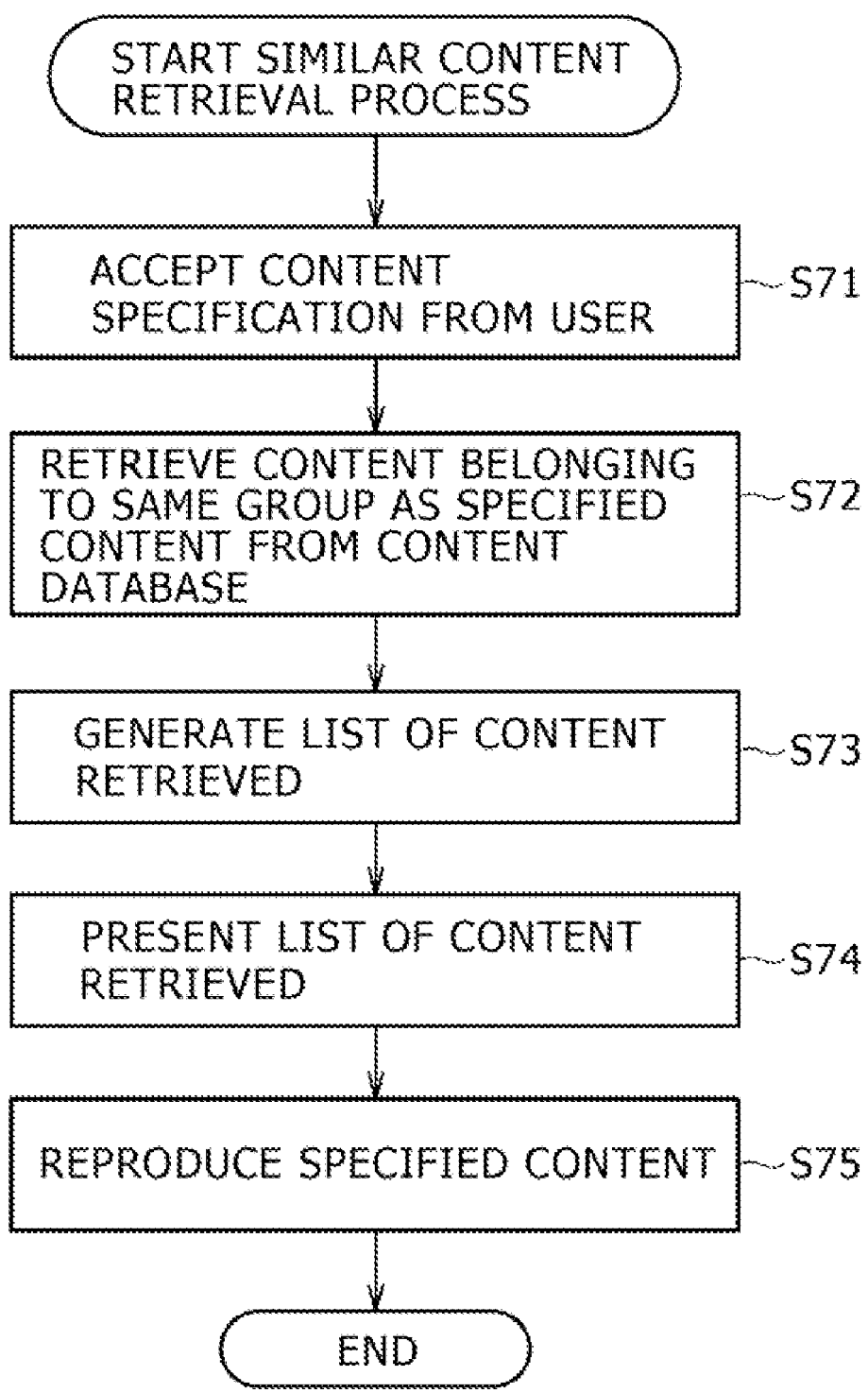
FIG. 27 is a flowchart describing a similar content retrieval process.

An information processing method and program of an embodiment of the present invention include the steps of converting (e.g., step S54 in FIG. 26) and retrieving (e.g., step S72 in FIG. 27). The converting step converts content feature quantities using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. The retrieval step retrieves similar pieces of content based on converted feature quantities.

Figure 1:
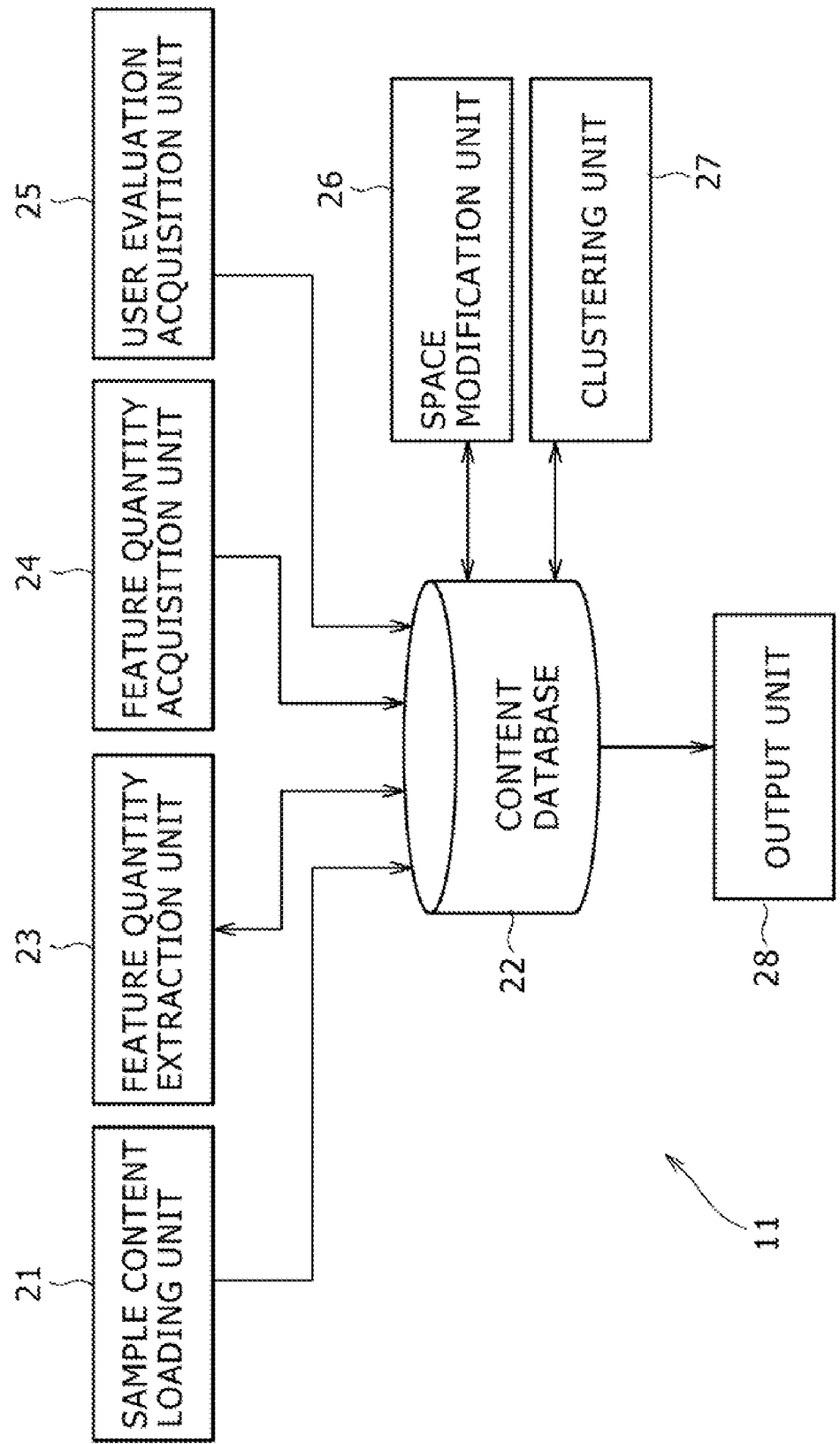
FIG. 1 is a block diagram illustrating an example of configuration of an information processing apparatus operable to modify a content feature quantity space.

FIG. 1 is a block diagram illustrating an example of configuration of an information processing apparatus 11 operable to modify a content feature quantity space and generate conversion functions adapted to acquire feature quantities in a modified space. The information processing apparatus 11 includes a sample content loading unit 21, a content database 22, a feature quantity extraction unit 23, a feature quantity acquisition unit 24, a user evaluation acquisition unit 25, a space modification unit 26, a clustering unit 27 and an output unit 28.

The sample content loading unit 21 loads sample content, which is a sample of content adapted to modify a content feature quantity space. The same unit 21 supplies sample content to the content database 22.

The content database 22 stores sample content from the sample content loading unit 21.

Here, content includes musical pieces (their data), moving or still images (their data) and so on.

A description will be made below about a case where content is musical pieces.

The feature quantity extraction unit 23 extracts feature quantities from sample content stored in the content database 22. The feature quantity extraction unit 23 extracts feature quantities of sample content, for example, by analyzing audio waveforms of sample content which is musical pieces. The feature quantity extraction unit 23 supplies extracted feature quantities to the content database 22.

The feature quantity acquisition unit 24 acquires feature quantities of sample content. For example, the same unit 24 acquires feature quantities entered by user operation. Alternatively, the same unit 24 acquires feature quantities of sample content such as review of that content by reading from a server via a network which is not shown. The same unit 24 supplies acquired feature quantities to the content database 22.

The user evaluation acquisition unit 25 acquires user evaluation from the content database 22. User evaluation represents the degree of similarity between pieces of sample content from user's subjective point of view regarding sample content stored in the content database 22. For example, the same unit 25 acquires evaluation entered by user operation. Alternatively, the same unit 25 acquires evaluation about sample content by reading from a server via a network which is not shown. The same unit 25 supplies acquired evaluation to the content database 22.

The space modification unit 26 modifies a feature quantity space of sample content. The same unit 26 supplies conversion functions, adapted to modify a feature quantity space of sample content, to the content database 22.

The clustering unit 27 performs clustering of sample content in a modified space. The same unit 27 finds a cluster centroid to supply the centroid position in a modified space to the content database 22. The cluster centroid (position) serves as a representative value of a content group. Here, the term "content group" refers to a group of pieces of content similar to each other.

The content database 22 stores not only sample content but also sample content feature quantities extracted by the feature quantity extraction unit 23, sample content feature quantities acquired by the feature quantity acquisition unit 24, user evaluation acquired by the user evaluation acquisition unit 25, conversion functions acquired by the space modification unit 26 and a cluster centroid position acquired by the clustering unit 27.

The output unit 28 outputs conversion functions acquired and a cluster centroid position stored in the content database 22 to external equipment upon request.

FIG. 2 is a block diagram illustrating the configuration of the space modification unit 26. The same unit 26 includes a conversion function generation unit 41 and the function evaluation value calculation unit 42.

The conversion function generation unit 41 generates functions adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. In other words, the same unit 41 generates, through a generic method, functions adapted to modify a space in which each of a plurality of content feature quantities serves as a dimensional axis into a space in which the distance between positions, each of which is determined by each of feature quantities of a plurality of pieces of content, is set according to the degree of similarity between pieces of content from user's subjective point of view. That is, the conversion function generation unit 41 generates, through a generic method, functions adapted to modify a space in which each of a plurality of feature quantities of sample content, stored in the content database 22, serves as a dimensional axis into a space in which the distance between feature quantities of a plurality of pieces of sample content, is set according to the user evaluation regarding sample content.

The function evaluation value calculation unit 42 calculates an evaluation value, which is an information criterion, from two values. One of the aforementioned two values is a value representing the degree of classification based on Euclidean distance between pieces of content considered to be similar or dissimilar in the user-entered similarity relationship between the plurality of pieces of content. The other is the number of free parameters of the functions. That is, the same unit 42 calculates an evaluation value or an information criterion, from two values. One of them is a value representing the degree of classification based on Euclidean distance between pieces of feature quantities of sample content subjectively perceived to be similar or dissimilar among those pieces of sample content between which the degree of similarity has been evaluated in advance by user evaluation. The other is the number of free parameters of the conversion functions.

The conversion function generation unit 41 repeatedly generates functions through a generic method according to a calculated evaluation value.

A description will be made below about modification of a feature quantity space of sample content by the space modification unit 26 with reference to FIGS. 3 to 15.

The term "feature quantity space" refers to a space in which each variable which is a feature quantity serves as a dimensional axis. On the other hand, the term "modification of a space" refers to modification of an original space into another space for a given purpose. That is, modification of a space means changing at least one of the dimensional axes of a space into a variable different from the original one.

Here, variables X are assumed to be variables constituting dimensions in an original space which includes n dimensions (n is a positive integer). Variables X' are assumed to be variables constituting dimensions in a modified space which includes m dimensions (m is a positive integer).

Figure 3:
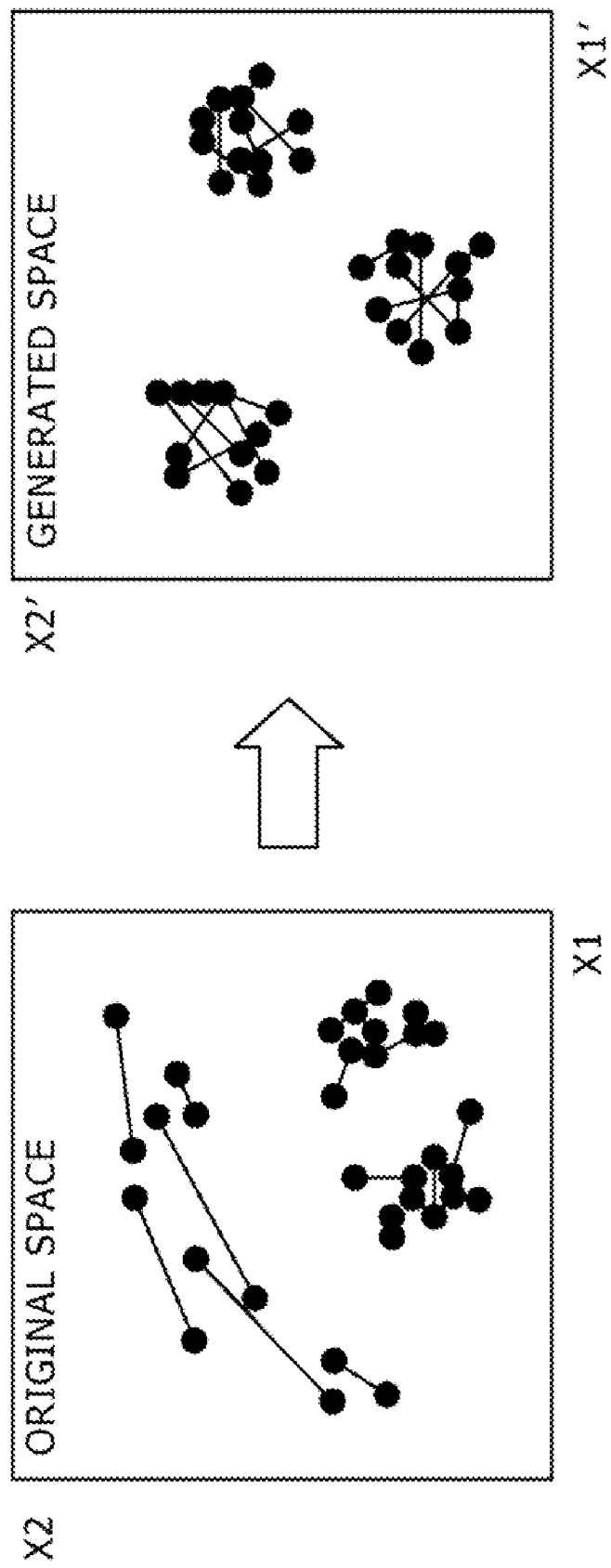
FIG. 3 is a view describing space modification.

As illustrated in FIG. 3, for example, a space is modified so that variables X1 and X2 which are the variables X in the original space are converted into variables X1' and X2'. In FIG. 3, each black circle represents a position in a space determined by a single content feature quantity. Each line between black circles in FIG. 3 connects those black circles at positions determined by feature quantities of pieces of content perceived to be similar in a user evaluation which represents the degree of similarity between pieces of content from user's subjective point of view.

Each of the dimensions in the modified space is generated by subjecting the variables in the original space to a given conversion process.

That is, as illustrated in formula (1), a vector $Xj'$ made up of the variables X' which constitute the dimensions in the modified space can be found by applying a conversion function $fj$ to a vector X made up of the variables X in the original space.

$$\text{Vector } Xj' = fj(\text{vector } X) \quad (1)$$

The conversion function $fj$ includes m conversion functions $f1$ to $fm$.

Formula (2) represents an example of the conversion function $f1$ for linear conversion.

$$f1(\text{vector } X) = X1 \times 0.5 \quad (2)$$

Formula (3) represents an example of the conversion function $f2$ for linear conversion.

$$f2(\text{vector } X) = X1 \times 0.1 + X2 \times 0.3 \quad (3)$$

Formula (4) represents an example of the conversion function $f3$ for nonlinear conversion using a kernel function.

$$f3(\text{vector } X) = K(\text{vector } X, \theta) \quad (4)$$

Figure 4:
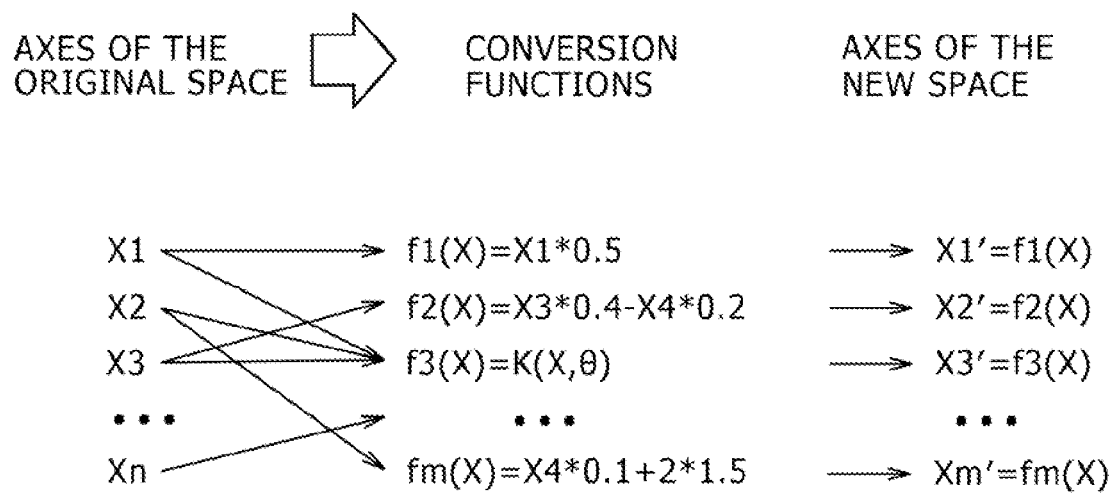
FIG. 4 is a view describing conversion functions.

As illustrated in FIG. 4, for example, the conversion function $fj$ including m conversion functions $f1$ to $fm$ is applied to the variables $X1$ to $Xn$ which are the axes of the original space having n dimensions. In the example of FIG. 4, the conversion function $fm$ is illustrated by formula (5).

$$fm(\text{vector } X) = X4 \times 0.1 + X2 \times 1.5 \quad (5)$$

Variables $X1'$ to $Xm'$ which are the axes of the converted space having m dimensions are represented by formula (6).

$$X1' = f1(\text{vector } X)$$

$$X2' = f2(\text{vector } X)$$

$$X3' = f3(\text{vector } X)$$

$$\ldots$$

$$Xm' = fm(\text{vector } X) \quad (6)$$

The conversion function fj is repeatedly optimized through a generic method so as to bring the converted space closer to a space more suited to the purpose.

For example, the conversion function fj is randomly generated to generate a predetermined number of spaces. That is, the plurality of conversion functions fj are generated. All the generated spaces are evaluated based on a function evaluation value found from a function evaluation function. Several spaces with a high evaluation value, namely, spaces which are more suited to the purpose, are selected. Alternatively, part of the conversion function fj of one space and part of the conversion function fj of other space are caused to intersect each other so that they are replaced with each other. Still alternatively, part of the conversion function fj of a space is mutated so that it is randomly changed. Still alternatively, a space is left to a new generation so that any of the conversion functions f1 to fm is newly and randomly generated.

Generation of spaces of a next generation by selection, intersection, mutation or random generation, and evaluation thereof with a function evaluation value will be repeated until the function evaluation value no longer increases.

An information criterion such as AIC (Akaike Information Criterion) or BIC (Schwarz's Bayesian Information Criterion) is used as the function evaluation value to prevent overlearning.

For example, AIC, an information criterion, is found by formula (7).

$$AIC = -2 \times \text{Max. log-likelihood} + 2 \times \text{Free parameter count} \quad (7)$$

For example, BIC, an information criterion, is found by formula (8).

$$BIC = -2 \times \text{Max. log-likelihood} + \log(\text{sample content evaluation count}) \times \text{Free parameter count} \quad (8)$$

Figure 5:
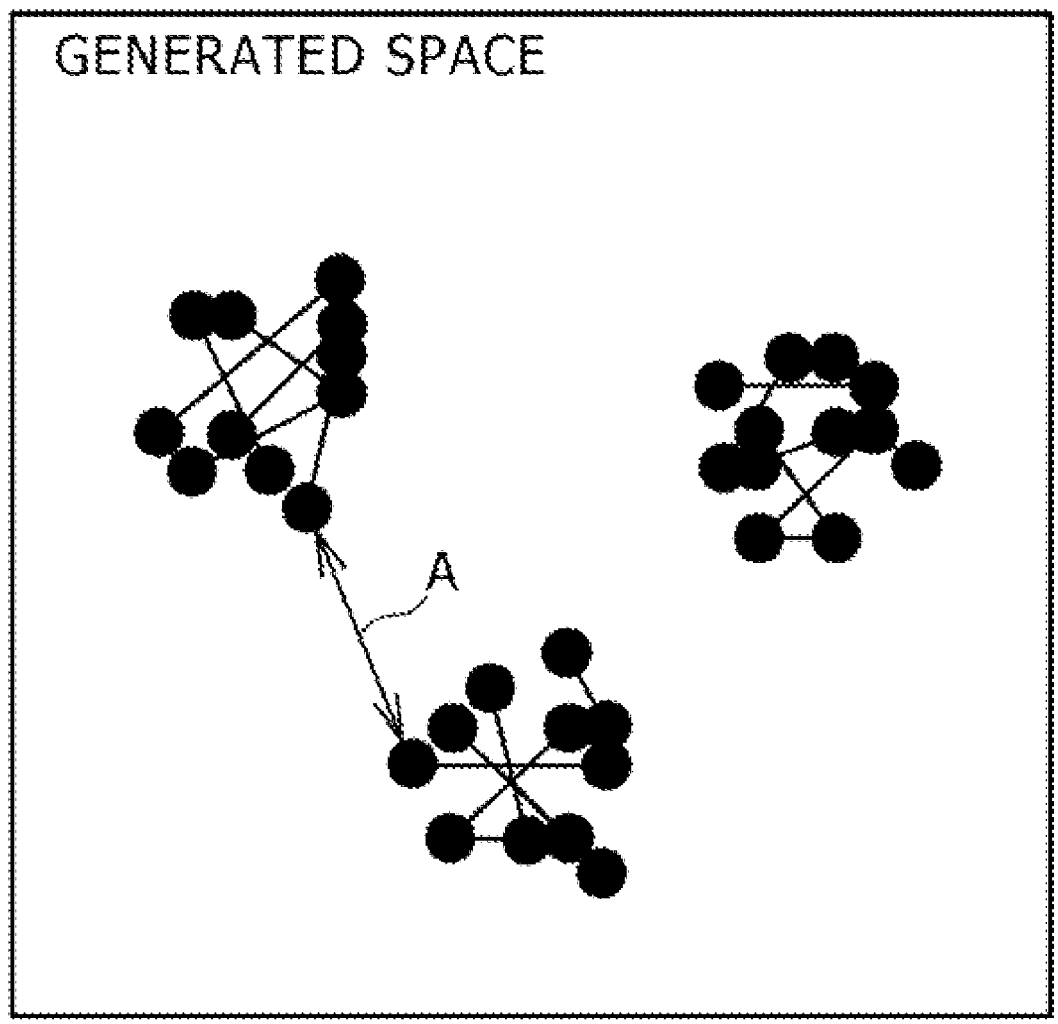
FIG. 5 is a view describing a modified space.

By simply measuring a Euclidean distance A as illustrated in FIG. 5, the space is modified so that the degree of similarity between pieces of content can be calculated based on a measure suited to the user's subjective point of view. That is, a generated space is modified so that the Euclidean distance A between positions represented by feature quantities of two pieces of content in the space represents the degree of similarity therebetween suited to the user's subjective point of view.

Here, a description sill be made more in detail about sample content, user evaluation about sample content, feature quantities, conversion functions and function evaluation value.

First, sample content and user evaluations thereabout, which are teacher data, are prepared by user testing. For example, content similarity data S is prepared as a user evaluation about sample content.

Sample content used for testing is represented by M, and the number of pieces of sample content used for testing by O (e.g., 1400).

If two pieces of sample content M1 and M2 are evaluated to be similar by the user, the similarity data S regarding the M1-M2 pair (M1, M2) is set to 0 which means that they are similar to each other.

If two pieces of sample content M1 and M3 are evaluated to be dissimilar by the user, the similarity data S regarding the M1-M3 pair (M1, M3) is set to 1 which means that they are dissimilar to each other.

Similarly, if two pieces of sample content M4 and M6 are evaluated to be similar by the user, the similarity data S regarding the M4-M6 pair (M4, M6) is set to 0 which means that they are similar to each other.

Here, the number of teacher data, which is sample content and evaluations thereabout prepared, may be fewer than that in the prior art. Further, there is no need to prepare the similarity data S for all possible pairs among 0 pieces of sample content which is, for example, 1400 pieces of content.

Next, feature quantities are prepared which properly represent feature of sample content. These feature quantities are used as variables making up an original space (space before modification). For example, feature quantities are prepared by acquiring feature quantities extracted in advance from sample content or by extracting feature quantities from sample content.

A feature quantity serving as a variable making up the original space will be represented below by a feature quantity $Fk_i$. Here, i is any of 1 to O (number of pieces of sample content).

For example, a feature quantity $Fk_1$ represents the speed of musical performance such as BPM (Beat Per Minute), namely, tempo. For instance, a feature quantity $Fk_2$ represents the speed which indicates whether the musical piece is fast or slow. The speed is a subjective point of view regarding the musical piece, namely, a speed perceived by the user who is listening to the musical piece. For example, the more there are sixteenth notes, the faster the musical piece is perceived to be.

A feature quantity $Fk_3$ represents dispersion or the extent of tempo fluctuation. On the other hand, a feature quantity $Fk_4$ represents major or major chord. A feature quantity $Fk_5$ represents notes or the number of notes per unit time.

Further, a feature quantity $Fk_n$ represents LoMid or the ratio of low-range energy to medium-range energy in the audio frequency band.

As illustrated in FIG. 6, the original space having the feature quantities $Fk_1$ to $Fk_n$ as its axes is deformed little by little into a space in which a Euclidean distance represents the degree of similarity between pieces of content.

When a space is modified as a result of update of the conversion function fj, a function evaluation value will be calculated. An information criterion is used as this function evaluation value. The information criterion is calculated from two values. One of them is an FDR (Fisher discriminant ratio) which represents the degree of classification between similar and dissimilar pieces of content based on Euclidean distance in a deformed space. The other value is the number of free parameters of the conversion functions.

FIG. 7 illustrates the concept of space modification through a generic method. For example, each of the original feature quantities in the original space is a dimension. Therefore, these dimensions are represented as {Tempo,Speed,Dispersion,Major,Notes,PitchMove, . . . ,LoMid}.

If the original space is caused to evolve to a next generation (hereinafter referred to as second generation) through a generic method, the dimensions in the second generation are represented, for example, as {Tempo,Speed,Dispersion× 1.35,Major,Notes, . . . ,LoMid}. In the evolution from the generation of the original space to the second generation, "Dispersion" is expanded, whereas "PitchMove" is deleted.

Further, if the space is caused to evolve from the second generation to the third generation through a generic method, the dimensions in the third generation are represented, for example, as {Tempo,Speed,Dispersion×1.35,K(Major,35), Notes, . . . ,LoMid}. In the evolution from the second to the third generation, "Major" is nonlinearly converted into "K(Major,35)" by a kernel function.

In the evaluation of a generated space, a Euclidean distance D is calculated between feature quantities of a pair of pieces of sample content given as teacher data in the newly generated space. For example, the Euclidean distance D is calculated between pieces of sample content Mk and Mi by formula (9).

[Expression 1]

$$D(Mk, Mi) = \sqrt{(\text{vector } Fk - \text{vector } Fi)^T (\text{vector } Fk - \text{vector } Fi)} \quad (9)$$

where the vector Fk is a feature quantity vector of the sample content Mk, the vector Fi a feature quantity vector of the sample content Mi, and T transposition. Further, the Euclidean distance D is calculated only for those pairs of the pieces of sample content Mk and Mi for which the similarity data S is available.

FIG. 8 illustrates the relationship between the Euclidean distance between feature quantities and the similarity between pieces of content. In FIG. 8, the solid line indicates the probability distribution of Euclidean distance between feature quantities of similar pieces of content in a modified space, whereas the dotted line indicates the probability distribution of Euclidean distance between feature quantities of dissimilar pieces of content in a modified space.

It can be said that the greater the difference in distance between similar and dissimilar pieces of content, the better the space represents the similarity between pieces of content.

To measure the difference in distance between feature quantities of similar and dissimilar pieces of content, an FDR (Fisher discriminant ratio) is calculated by formula (10) for two classes, one for similar pieces of content and the other for dissimilar pieces of content.

[Expression 2]

$$\text{FDR} = (\text{Mean distance between similar musical pieces} - \text{Mean distance between dissimilar musical pieces})^2 / \text{Standard deviation of distance between similar musical pieces} + \text{Standard deviation of distance between dissimilar musical pieces} \quad (10)$$

Figure 9:
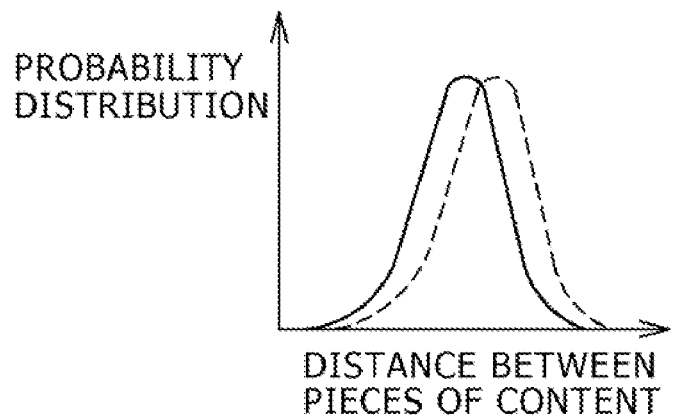
FIG. 9 is a view illustrating the relationship between Euclidean distance between feature quantities of similar or dissimilar pieces of content and an FDR value in a modified space.
Figure 10:
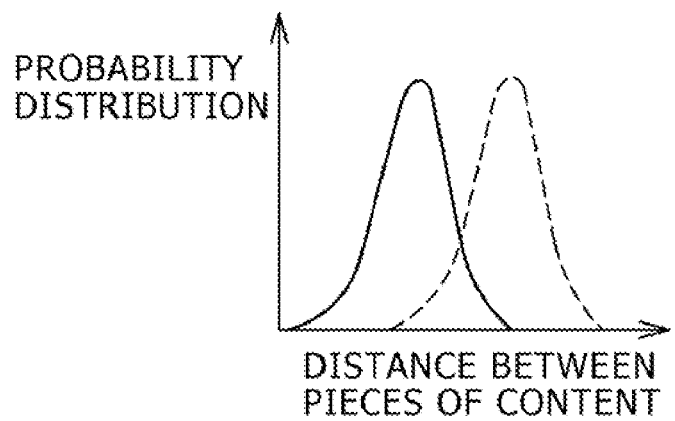
FIG. 10 is a view illustrating the relationship between Euclidean distance between feature quantities of similar or dissimilar pieces of content and the FDR value in a modified space.
Figure 11:
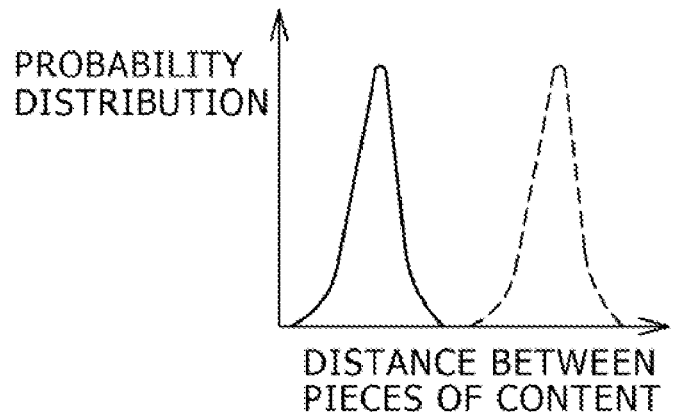
FIG. 11 is a view illustrating the relationship between Euclidean distance between feature quantities of similar or dissimilar pieces of content and the FDR value in a modified space.

FIGS. 9 to 11 illustrate the relationship between Euclidean distance between feature quantities of similar or dissimilar pieces of content in a modified space and FDR value. In FIGS. 9 to 11, the solid line indicates the probability distribution of Euclidean distance between feature quantities of similar pieces of content in a modified space, whereas the dotted line indicates the probability distribution of Euclidean distance between feature quantities of dissimilar pieces of content in a modified space.

As illustrated in FIG. 9, if the difference in Euclidean distance is small between feature quantities of similar and dissimilar pieces of content, the FDR is small. As illustrated in FIGS. 10 and 11, the larger the difference in Euclidean distance between feature quantities of similar and dissimilar pieces of content, the greater the FDR value is. That is, the more distinct the difference in Euclidean distance is between feature quantities of similar and dissimilar pieces of content, the greater the FDR value is.

For example, the FDR is used as the maximum log-likelihood in formula (7) which calculates AIC, an information criterion.

FIG. 12 illustrates examples of free parameters. In FIG. 12, those values enclosed by a dotted circle are free parameters. The free parameter count in formula (7) is set, for example, to the count illustrated in FIG. 12.

For example, in the conversion function "f1(vector X)=X1×0.5", "0.5" is a free parameter. In the conversion function "f2(vector X)=X3×0.4−X4×0.2", "0.4" and "0.2" are free parameters. In the conversion function "f3(vector X)=exp(−sqr(X3×0.5)/0.5)×0.6", "0.5" by which X3 is multiplied, "0.5" which is a divisor, and "0.6", are free parameters. In the conversion function "fm(vector X)=X4×0.1+X2×1.5", "0.1" and "1.5" are free parameters.

The smaller the AIC value which is an information criterion, the better. In generic operation adapted to create a space of next generation, namely, generate conversion functions for a next generation, therefore, the smaller the AIC value, the more likely it is to be selected.

It should be noted that the same is true when using BIC, an information criterion, as a function evaluation value and therefore description thereof is omitted.

As described above, the conversion function generation unit 41 generates functions adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. As a result, the space modification unit 26 modifies the feature quantity space of sample content.

Space modification functions are generated repeatedly through a generic method according to an evaluation value which is an information criterion calculated from two values. One of them is a value, calculated by the function evaluation value calculation unit 42, which represents the degree of classification based on Euclidean distance between pieces of content considered to be similar and dissimilar in the user-entered similarity relationship between the plurality of pieces of content. The other is the number of free parameters of the functions.

The content similarity data S was described as indicating whether or not pieces of content are similar. However, the same data S may be a continuous value representing the degree of similarity. For example, the same data S is any real number from 0 which represents complete identicalness to 1 which represents complete difference.

For example, if the two pieces of content M1 and M2 are evaluated to be somewhat similar by the user, the similarity data S regarding the pair (M1, M2) is set to 0.3 which means that they are somewhat similar to each other.

If the pieces of content M1 and M3 are evaluated to be dissimilar by the user, the similarity data S regarding the pair (M1, M3) is set to 0.9 which means that they are dissimilar to each other.

Similarly, if two pieces of content M4 and M6 are evaluated to be neither similar nor dissimilar by the user, the similarity data S regarding the pair (M4, M6) is set to 0.5 which means that they are neither similar nor dissimilar to each other.

In this case, AIC or other information criterion, calculated using the correlation between the similarity data S and the Euclidean distance, is used as a function evaluation value. For example, the maximum log-likelihood in formula (7) which calculates AIC, an information criterion, is calculated from a correlation value.

Figures 15, 16:
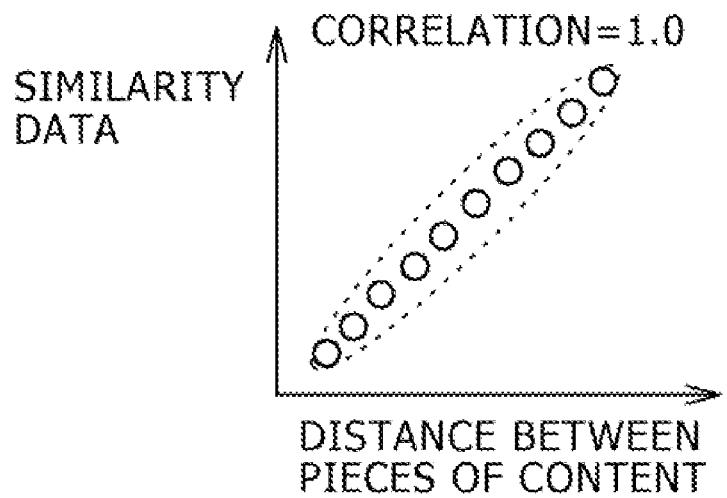
FIG. 15 is a view illustrating the relationship between the correlation value, the similarity data S and distance between content feature quantities.
FIG. 16 is a view illustrating an example of cluster count and matching rate.

FIG. 13 illustrates the relationship between the similarity data S and the distance between feature quantities of content when the correlation value is 0.0. FIG. 14 illustrates the relationship between the similarity data S and the distance between feature quantities of content when the correlation value is 0.5. FIG. 15 illustrates the relationship between the similarity data S and the distance between feature quantities of content when the correlation value is 1.0.

As illustrated in FIGS. 13 to 15, if the content similarity data S is a continuous value representing the degree of similarity, it can be said that the higher the correlation between the distance between feature quantities in a space and the similarity data S, the better the space represents the similarity between pieces of content. That is, the space having a correlation value of 0.5 as illustrated in FIG. 14 better represents the degree of similarity between pieces of content than the space having a correlation value of 0.0 as illustrated in FIG. 13. Further, the space having a correlation value of 1.0 as illustrated in FIG. 15 better represents the degree of similarity between pieces of content than the space having a correlation value of 0.5 as illustrated in FIG. 14.

Further, the clustering unit 27 performs clustering of sample content in the space where the feature quantities of sample content have been modified.

The clustering unit 27 performs clustering of sample content by classification based on Euclidean distance between feature quantities of content such as the K-means method.

In the clustering of sample content, the cluster count is varied. The smallest cluster count that matches the similarity data S is selected. That is, of the cluster counts that match the similarity data S, the smallest count is chosen.

As illustrated in FIG. 16, for example, the cluster count is increased successively from 1 to 36 and beyond for clustering of sample content.

A matching rate is found with the similarity data S for each of the cluster counts. In the example illustrated in FIG. 16, the matching rate with the similarity data S is 0.45 when the cluster count is one. The matching rate with the similarity data S is 0.48 when the cluster count is two. Similarly, the matching rates with the similarity data S is 0.95 and 0.88 respectively when the cluster count is 35 and 36.

We suppose, for example, that the matching rate with the similarity data S is 0.95 when the cluster count is 52 (not shown), and that the matching rate with the similarity data S is 0.95 when the cluster count is 35. In this case, the cluster count of 35 is chosen which is smaller than the cluster count of 52 among the cluster counts having a maximum matching rate of 0.95.

Here, the matching rate between the cluster count and the similarity data S will be described with reference to FIGS. 17 and 18.

To obtain the matching rate, for example, two values are added together first. These values are the number of cases where two pieces of content evaluated to be similar to each other based on the similarity data S belong to the same cluster and the number of cases where two pieces of content evaluated to be dissimilar to each other based on the similarity data S belong to different clusters. Then the sum is divided by the number of evaluations based on the similarity data S.

In FIG. 17, those evaluations marked with a circle indicate that the two pieces of content are evaluated to be similar to each other by the user. On the other hand, those evaluations marked with a cross indicate that the two pieces of content are evaluated to be dissimilar to each other by the user.

A description will be made below about the following case. That is, as illustrated in FIG. 17, for example, content_A and content_B are evaluated to be similar to each other by the user. As a result, the similarity data S thereabout (content_A, content_B) is set to 0 which means that they are similar. Content_A and content_C are evaluated to be dissimilar to each other by the user. As a result, the similarity data S thereabout (content_A, content_C) is set to 1 which means that they are dissimilar. Content_A and content_D are evaluated to be dissimilar to each other by the user. As a result, the similarity data S thereabout (content_A, content_D) is set to 1 which means that they are dissimilar. Content_B and content_C are evaluated to be dissimilar to each other by the user. As a result, the similarity data S thereabout (content_B, content_C) is set to 1 which means that they are dissimilar. Content_B and content_D are evaluated to be dissimilar to each other by the user. As a result, the similarity data S thereabout (content_B, content_D) is set to 1 which means that they are dissimilar. Content_C and content_D are evaluated to be similar to each other by the user. As a result, the similarity data S thereabout (content_C, content_D) is set to 0 which means that they are similar.

In the example illustrated in FIG. 17, the number of evaluations based on the similarity data S is six.

Figure 19:
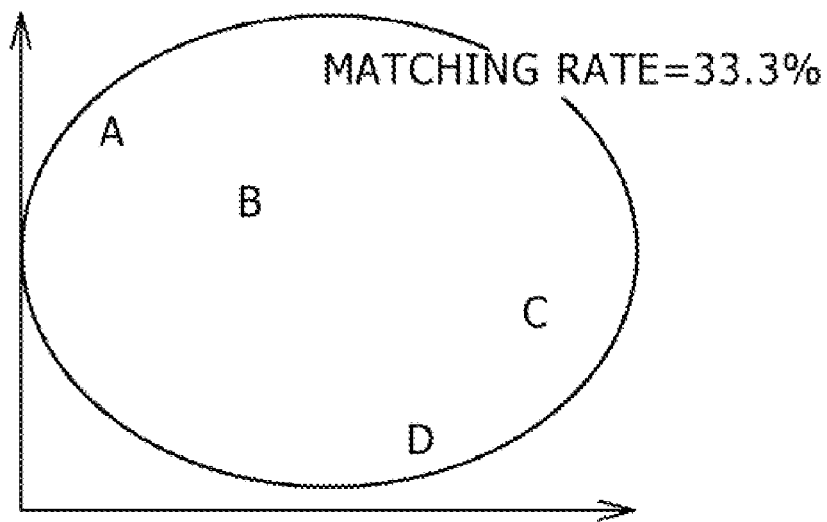
FIG. 19 is a view illustrating an example of cluster.

In the example illustrated in FIG. 18, there is only one cluster. In this case, all pieces of content from content_A to content_D belong to one cluster as illustrated in FIG. 19. The evaluations based on the similarity data S for two pairs, namely, content_A and content_B, and content_C and content_D, match the clustering results. On the other hand, the evaluations based on the similarity data S for four pairs, namely, content_A and content_C, content_A and content_D, content_B and content_C, content_B and content_D, do not match the clustering results. As a result, the matching rate is 2/6 or 33.3%.

Figure 20:
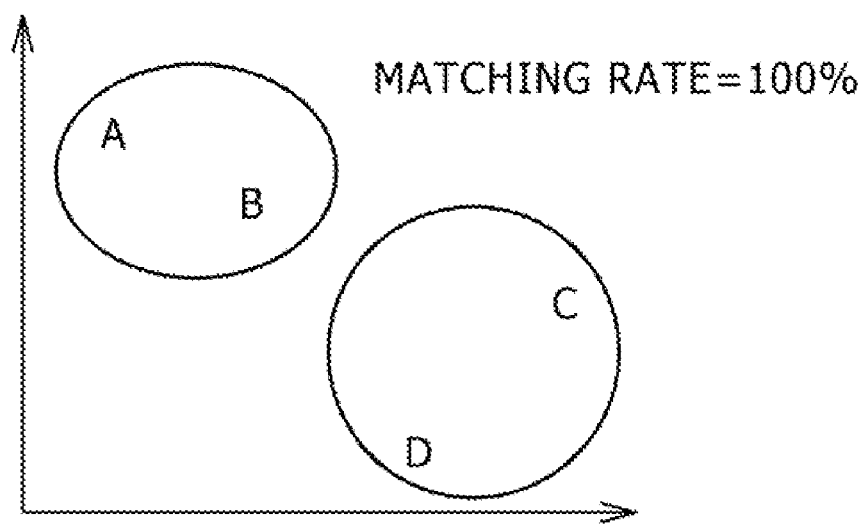
FIG. 20 is a view illustrating an example of clusters.

In the example illustrated in FIG. 20, there are two clusters. Content_A and content_B belong to one cluster, and content_C and content_D belong to another cluster. Content_A belongs to a different cluster from that of content_C and content_D. Content_B belongs to a different cluster from that of content_C and content_D. The evaluations based on the similarity data S for all pairs match the clustering results. As a result, the matching rate is 6/6 or 100%.

Figure 21:
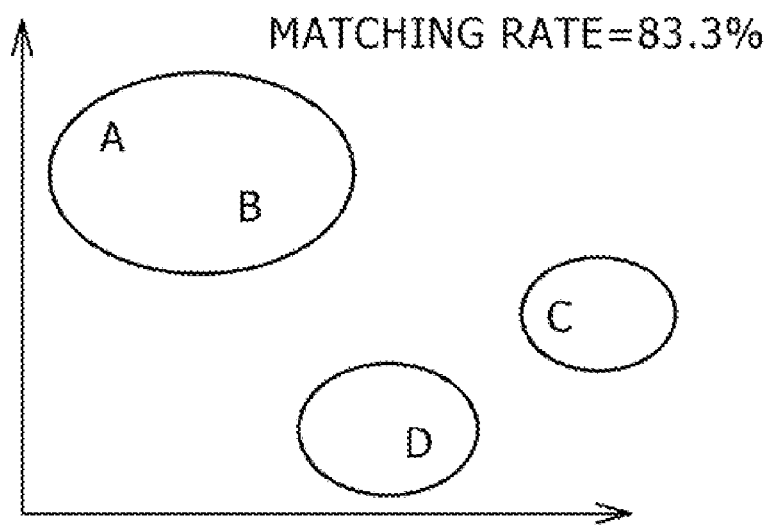
FIG. 21 is a view illustrating an example of clusters.

In the example illustrated in FIG. 21, there are three clusters. Content_A and content_B belong to one cluster. Content_C belongs to another cluster. Content_D belongs to still another cluster. Content_C belongs to a different cluster from that of content_A and content_B. Content_D belongs to a different cluster from that of content_A and content_B. Content_C and content_D belong to different clusters. In this case, the evaluations based on the similarity data S for five pairs, namely, content_A and content_B, and content_A and content_C, content_A and content_D, content_B and content_C, and content_B and content_D, match the clustering results. On the other hand, the evaluation based on the similarity data S for one pair, namely, content_C and content_D, does not match the clustering result. As a result, the matching rate is 5/6 or 83.3%.

Figure 22:
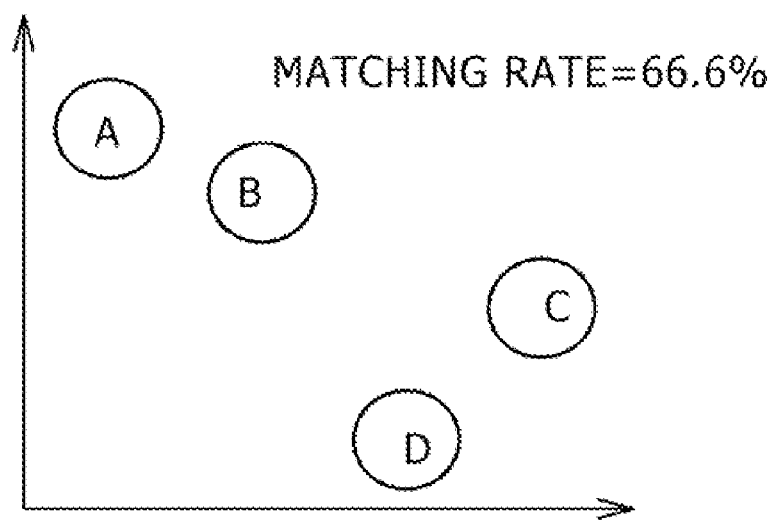
FIG. 22 is a view illustrating an example of clusters.

In the example illustrated in FIG. 22, there are four clusters. All pieces of content, namely, content_A to content_D, belong to different clusters from one another. In this case, the evaluations based on the similarity data S for four pairs, namely, content_A and content_C, and content_A and content_D, content_B and content_C, and content_B and content_D, match the clustering results. On the other hand, the evaluations based on the similarity data S for two pairs, namely, content_A and content_B, and content_C and content_D, do not match the clustering results. As a result, the matching rate is 4/6 or 66.6%.

In the examples illustrated in FIGS. 17 and 18, the clustering results for the cluster count of two is selected as they offer a matching rate of 100% and therefore agree most with the similarity data S.

It should be noted that the matching rate may not necessarily be the value obtained by the following. That is, the number of cases where two pieces of content evaluated to be similar to each other based on the similarity data S belong to the same cluster is added to the number of cases where two pieces of content evaluated to be dissimilar to each other based on the similarity data S belong to different clusters. Then the sum is divided by the number of evaluations based on the similarity data S. The matching rate need only be a criterion which makes it clear that the similarity data S agrees with the content classification based on clusters. For instance, if the similarity data S from a plurality of users is used, the matching rate may be calculated using a weight assigned to a piece of content for which the same evaluation is obtained from two or more users, that is, a piece of content about which a number of users make the same evaluation.

Alternatively, clustering results may be selected using recall and precision rates for pairs of similar or dissimilar pieces of content.

Figure 23:
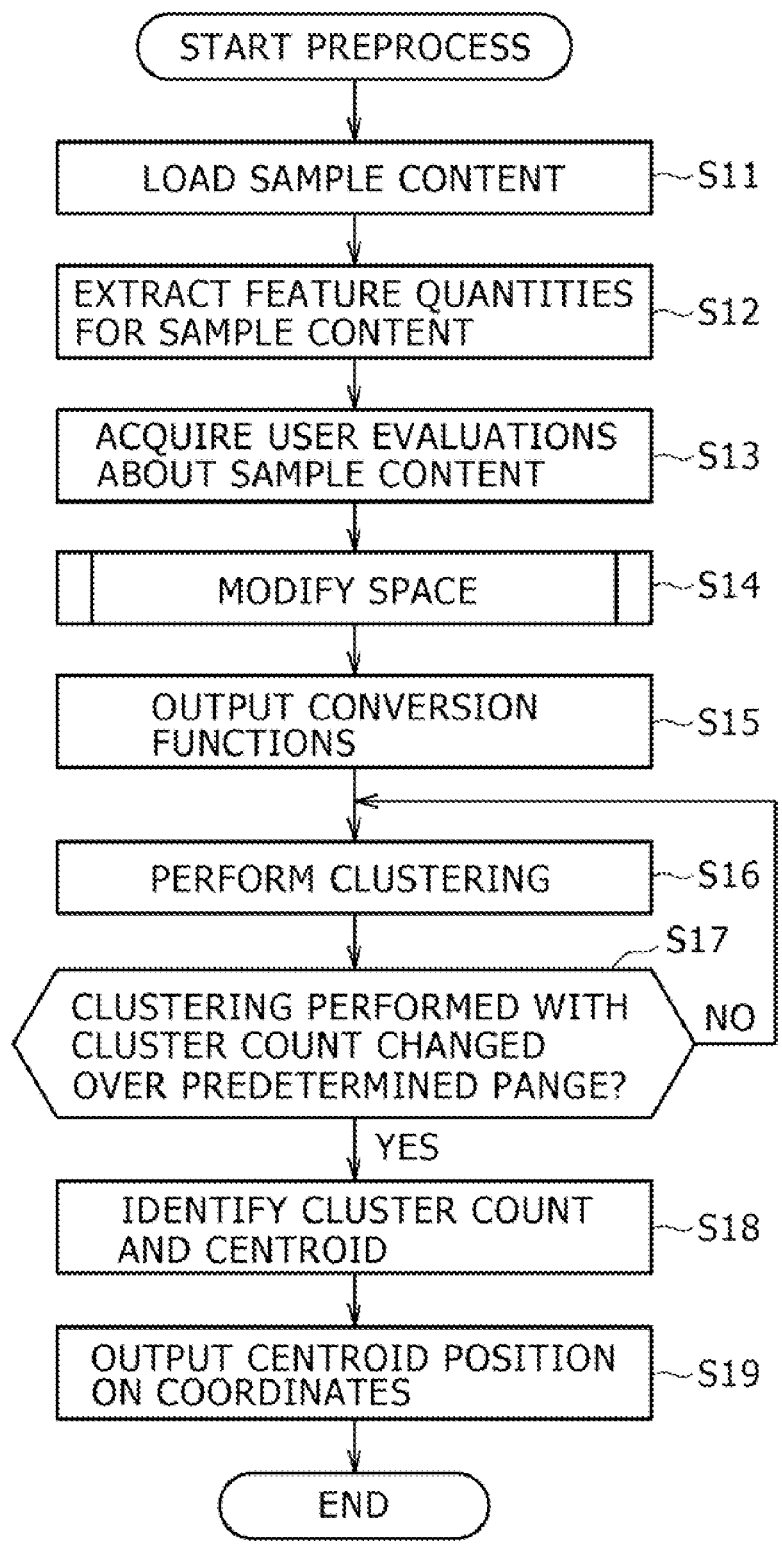
FIG. 23 is a flowchart describing a preprocess.

Next, the preprocess before space modification will be described with reference to the flowchart in FIG. 23. In step S11, the sample content loading unit 21 loads sample content. The same unit 21 supplies the loaded content to the content database 22. The content database 22 stores the sample content.

In step S12, the feature quantity extraction unit 23 extracts feature quantities for the sample content. The same unit 23 supplies the extracted feature quantities to the content database 22. The content database 22 stores the extracted feature quantities.

It should be noted that the feature quantity acquisition unit 24 may acquire feature quantities extracted in advance which are the feature quantities for sample content. For instance, the same unit 24 does so by acquiring feature quantities from a given server or reading them from a given recording medium.

In step S13, the user evaluation acquisition unit 25 acquires user evaluations about sample content. That is, the same unit 25 acquires the similarity data S which is user evaluations about sample content. More specifically, the same unit 25 acquires the similarity data S, for example, by acquiring the signal for user operation from an operation unit such as a keyboard or touch panel. Further, the same unit 25 acquires user evaluations about sample content, for example, by acquiring the similarity data S from a given server or reading it from a given recording medium.

The user evaluation acquisition unit 25 supplies the similarity data S, which is user evaluations about sample content, to the content database 22. The content database 22 stores the similarity data S.

In step S14, the space modification unit 26 performs the space modification process.

Figure 24:
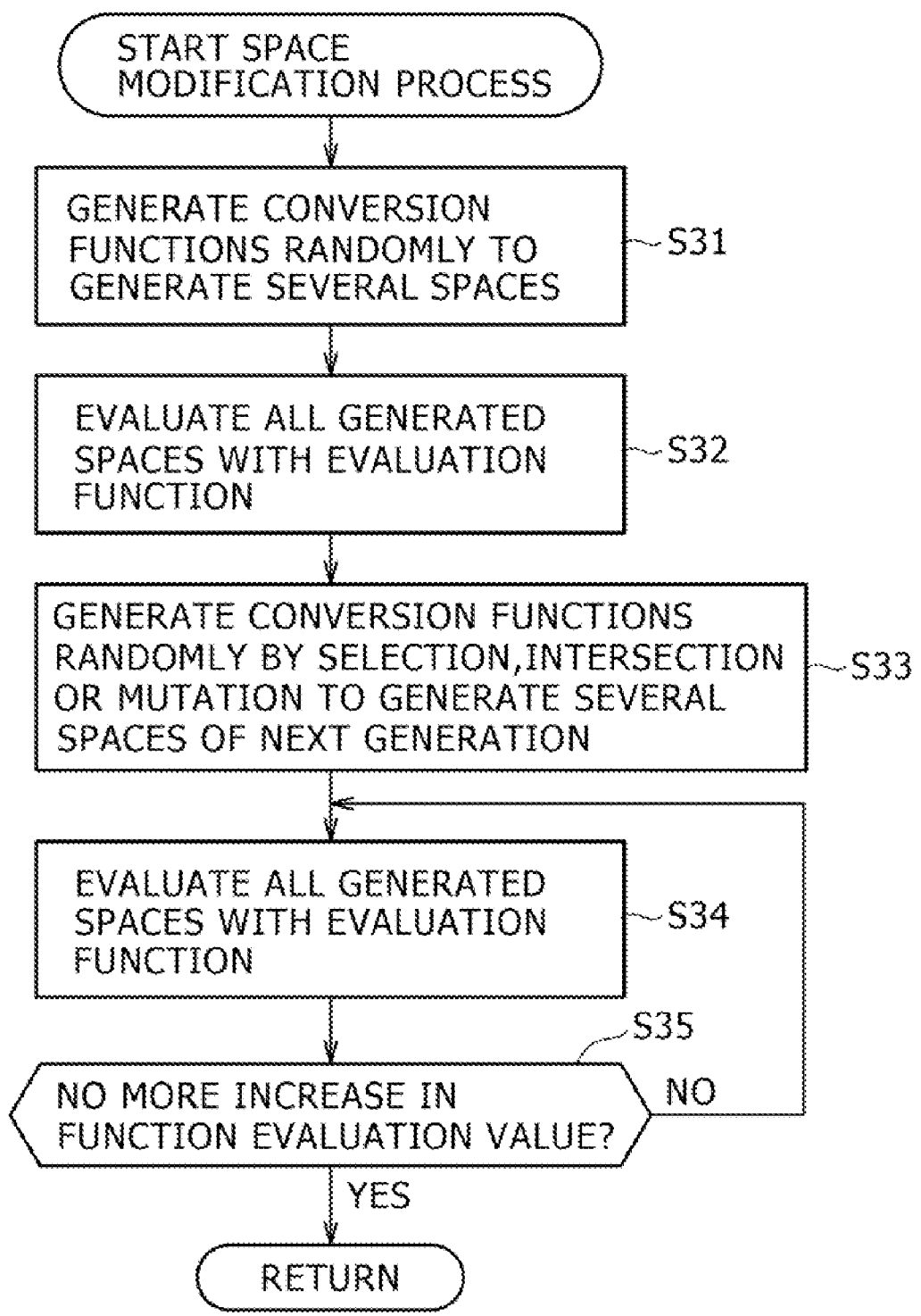
FIG. 24 is a flowchart describing a space modification process.

FIG. 24 is a flowchart describing a space modification process. In step S31, the conversion function generation unit 41 of the space modification unit 26 generates conversion functions randomly to generate several spaces. That is, the conversion function generation unit 41 generates the plurality of conversion functions fj randomly.

In step S32, the function evaluation value calculation unit 42 of the space modification unit 26 evaluates all the generated spaces with an evaluation function. That is, the same unit 42 evaluates each of the generated spaces with an evaluation function by calculating a function evaluation value. The function evaluation value is an information criterion calculated from two values. One of them is a value representing the degree of classification based on Euclidean distance between pieces of sample content subjectively perceived to be similar and dissimilar among those pieces of sample content between which the degree of similarity has been evaluated in advance from user's subjective point of view. The other is the number of free parameters of the conversion functions fj.

In step S33, the conversion function generation unit 41 generates new conversion functions randomly by selection, intersection or mutation through a generic method to generate several spaces of a new generation. That is, in step S33, the same unit 41 generates the plurality of conversion functions fj of a next generation through a generic method.

In step S34, the function evaluation value calculation unit 42 evaluates all the spaces generated in step S33 with an evaluation function.

In step S35, the function evaluation value calculation unit 42 compares the function evaluation value calculated in step S32 with that calculated in step S34 to determine whether the function evaluation value has stopped increasing. If the same unit 42 determines that the function evaluation value has increased, control returns to step S33 where the aforementioned process is repeated so that spaces of a next generation will be generated. More specifically, the function evaluation value calculation unit 42 determines whether there is a difference between the previous and current function evaluation values. By determining whether the evaluation value has been updated a predetermined number of generations, the same unit 42 determines whether the function evaluation value has stopped increasing.

In the second repetition of step S35 onward, the function evaluation value calculation unit 42 compares the function evaluation value calculated in the previous repetition of step S34 with that calculated in the current repetition of step S34 to determine whether the function evaluation value has stopped increasing. That is, in step S35, the function evaluation value for spaces of a previous generation is compared with that for spaces of a next generation to determine whether the value has stopped increasing.

If, in step S35, the function evaluation value is determined to have stopped increasing, the space modification unit 26 outputs the generated conversion functions, namely, those functions which have been repeatedly generated through a generic method until the function evaluation value no longer changes, to the content database 22. Then the same unit 26 terminates the space modification process.

In the example described above, the functions are generated until the evaluation value is no longer updated one generation. However, the functions are generated, for example, until the evaluation value is no longer updated a predetermined number of generations such as two or three generations.

The content database 22 stores the conversion functions from the space modification unit 26.

Referring back to FIG. 23, in step S15, the output unit 28 outputs the generated conversion functions from the content database 22. That is, the output unit 28 reads, from the content database 22, the conversion functions acquired by repeated generation through a generic method until the function evaluation value no longer changes. Then the same unit 28 outputs the functions read.

The space modification unit 26 outputs feature quantities to the content database 22. The feature quantities have been converted by the conversion functions output to the content database 22. The content database 22 stores the feature quantities from the space modification unit 26.

In step S16, the clustering unit 27 performs clustering of sample content in the modified space to calculate the matching rate from the clusters and the similarity data S. That is, the same unit 27 performs clustering of sample content based on the converted feature quantities.

It should be noted that the clustering unit 27 may convert the feature quantities for sample content using the conversion functions stored in the content database 22.

In step S17, the clustering unit 27 determines whether clustering has been performed with a cluster count changed over a predetermined range. If the same unit 27 determines that clustering has yet to be performed as described above, control returns to step S16 where clustering is performed with a next cluster count to calculate the matching rate. Steps S16 and S17 will be repeated until clustering is complete with a cluster count changed over the predetermined range.

In step S17, when the clustering unit 27 determines that clustering has been performed with a cluster count changed over a predetermined range, control proceeds to step S18. In step S18, the same unit 27 identifies the smallest cluster count from among those cluster counts with the highest matching rate. Then the same unit 27 identifies the cluster centroid position for the identified cluster count. The same unit 27 supplies the cluster centroid position to the content database 22. The content database 22 stores the centroid position.

In step S19, the output unit 28 reads the centroid position on coordinates of the modified space from the content database 22. Then the same unit 28 outputs the centroid position to terminate the process.

As described above, the conversion functions and the centroid position are stored in the content database 22, and output externally by the output unit 28.

Information about the conversion functions and the centroid position output from the output unit 28 is used in an information processing apparatus 101 used by users which will be described next.

Next, a description will be made about the information processing apparatus 101 which is stationary equipment operable to record and reproduce content and identify similar pieces of content.

FIG. 25 is a block diagram illustrating an example of structure of the information processing apparatus 101. The information processing apparatus 101 includes a content loading unit 121, a feature quantity extraction unit 122, a content database 123, an evaluation data storage unit 124, a content group identification unit 125, an operation unit 126, a retrieval process unit 127, a presentation unit 128 and a reproduction unit 129.

The content loading unit 121 loads content, for example, by reading from a CD (Compact Disk) or downloading from a server via a network.

The feature quantity extraction unit 122 extracts feature quantities of content loaded by the content loading unit 121. The same unit 122 extracts the same feature quantities as those extracted by the feature quantity extraction unit 23. The same unit 122 supplies the loaded content and the extracted feature quantities to the content database 123.

It should be noted that the operation unit 126 may acquire feature quantities entered by user operation. Alternatively, an acquisition unit which is not shown may read feature quantities from a server connected via a network which is not shown to acquire such quantities.

The content database 123 stores the extracted feature quantities together with the loaded content.

The content group identification unit 125 identifies the content group to which the loaded content belongs based on the conversion functions and the centroid position stored in advance in the evaluation data storage unit 124.

The content group identification unit 125 includes the feature quantity conversion unit 131. The feature quantity conversion unit 13: reads the feature quantities from the loaded content. The same unit 131 converts the feature quantities using the conversion functions stored in advance in the evaluation data storage unit 124.

The content group identification unit 125 compares the position represented by the converted feature quantities with the centroid position stored in advance in the evaluation data storage unit 124. By doing so, the same unit 125 identifies the group having a centroid closest to the feature quantities. The same unit 125 supplies information about the identified content group to the content database 123.

The content database 123 stores the information about the content group identified by the content group identification unit 125 together with the loaded content and its feature quantities.

The operation unit 126 includes a keyboard or remote controller. The same unit 126 accepts an operational instruction from the user such as selection of content or retrieval of similar pieces of content. The same unit 126 supplies a signal for the accepted instruction to the retrieval process unit 127.

In response to the signal from the operation unit 126, the retrieval process unit 127 extracts a specific group of content as the user selects or retrieves content. The same unit 127 retrieves pieces of content similar to that selected by the user among those pieces of content stored in the content database 123.

The presentation unit 128 includes an LCD (Liquid Crystal Display), organic EL (Electro Luminescence) display or other type of display. The same unit 128 presents a list of pieces of content similar to that selected by the user which have been retrieved by the retrieval process unit 127.

The reproduction unit 129 reproduces the piece of content selected by the user. For example, when the user instructs that the content, a musical piece, be reproduced, the reproduction unit 129 decodes the content in data form and reproduces it so as to produce an audio output of the content which is a musical piece. Further, when the user instructs that a group of content be reproduced, the same unit 129 reproduces the specified group of content.

It should be noted that the content database 123 may be provided in the information processing apparatus 101 or in a server external to the information processing apparatus 101. In this case, the content database 123 is connected to the information processing apparatus 101 via a network which is not shown.

Next, a description will be made about a content loading process performed for all pieces of content during content reading. The content loading process is carried out on content to be added if such an addition is made.

FIG. 26 is a flowchart describing the content loading process by the information processing apparatus 101. In step S51, the content loading unit 121 loads content, for example, by reading from a CD or downloading from a server via a network. In step S52, the feature quantity extraction unit 122 extracts feature quantities of the content loaded in step S51. For example, the same unit 122 extracts feature quantities such as tempo, speed, extent of tempo fluctuation, major chord ratio, number of notes per unit time or ratio of low-range energy to medium-range energy in the audio frequency band.

In step S53, the feature quantity extraction unit 122 stores feature quantities together with content in the content database 123.

In step S54, the feature quantity conversion unit 131 of the content group identification unit 125 reads feature quantities of the loaded content from the content database 123. The same unit 131 converts the read feature quantities using the conversion functions stored in the evaluation data storage unit 124.

In step S55, the content group identification unit 125 calculates the distance between the feature quantities converted with the conversion functions and the centroid indicated by the information stored in the evaluation data storage unit 124. In step S56, the content group identification unit 125 identifies the content group to which the content belongs so that the group of the loaded content is the content group having a centroid shortest in distance to the feature quantities.

In step S57, the content group identification unit 125 causes the content database 123 to store the converted feature quantities and the information about the identified content group. As a result, the same unit 125 registers the converted feature quantities and the identified content group in the content database 123 to terminate the process.

As described above, as a piece of content is loaded, feature quantities are found in a space modified for that piece of content. Then the content group to which the loaded piece of content belongs is identified from among content groups classified according to those feature quantities.

When content is specified by the information processing apparatus 101, pieces of content similar to the specified one are retrieved.

A similar content retrieval process will be described next with reference to the flowchart in FIG. 27. In step S71, the operation unit 126 accepts a specification of a piece of content to be reproduced from the user. In response to the user operation, the same unit 126 supplies a signal Indicating the specified piece of content to the retrieval process unit 127.

In step S72, the retrieval process unit 127 retrieves the pieces of content belonging to the same content group as that of the specified piece of content from the content database 123. That is, the same unit 127 retrieves other pieces of content belonging to the same content group as that of the specified piece of content.

It should be noted that, in step S72, the retrieval process unit 127 may retrieve pieces of content similar to the specified one by other method based on the converted feature quantities. For example, the same unit 127 may retrieve the piece of content whose feature quantities have the shortest Euclidean distance to the feature quantities of the specified piece of content, based on the converted feature quantities stored in the content database 123.

In step S73, the retrieval process unit 127 generates a list of pieces of content retrieved. In step S73, the same unit 127 generates a list indicating, for example, names of the pieces of content retrieved and performers or composers. The same unit 127 supplies the generated list to the presentation unit 128 via the content database 123.

In step S74, the presentation unit 128 presents the list of pieces of content retrieved which was generated by the retrieval process unit 127. This list includes the pieces of content similar to the specified one.

In step S75, the reproduction unit 129 reproduces the piece of content specified by the user to terminate the process.

As described above, when a piece of content is specified by the user, a list of pieces of content will be presented which are similar to the one specified.

During reproduction of a piece of content by the user, a list of pieces of content will be presented, as candidates, which are similar to the one being reproduced.

It should be noted that when the user specifies a piece of content and instructs that a list of pieces of content be presented which are similar to the one specified, a list of pieces of content may be presented which are similar to the one specified among those stored in the content database 123 by a process similar to steps S72 to S74.

Alternatively, the space may be modified by the side which identifies similar pieces of content.

Figure 28:
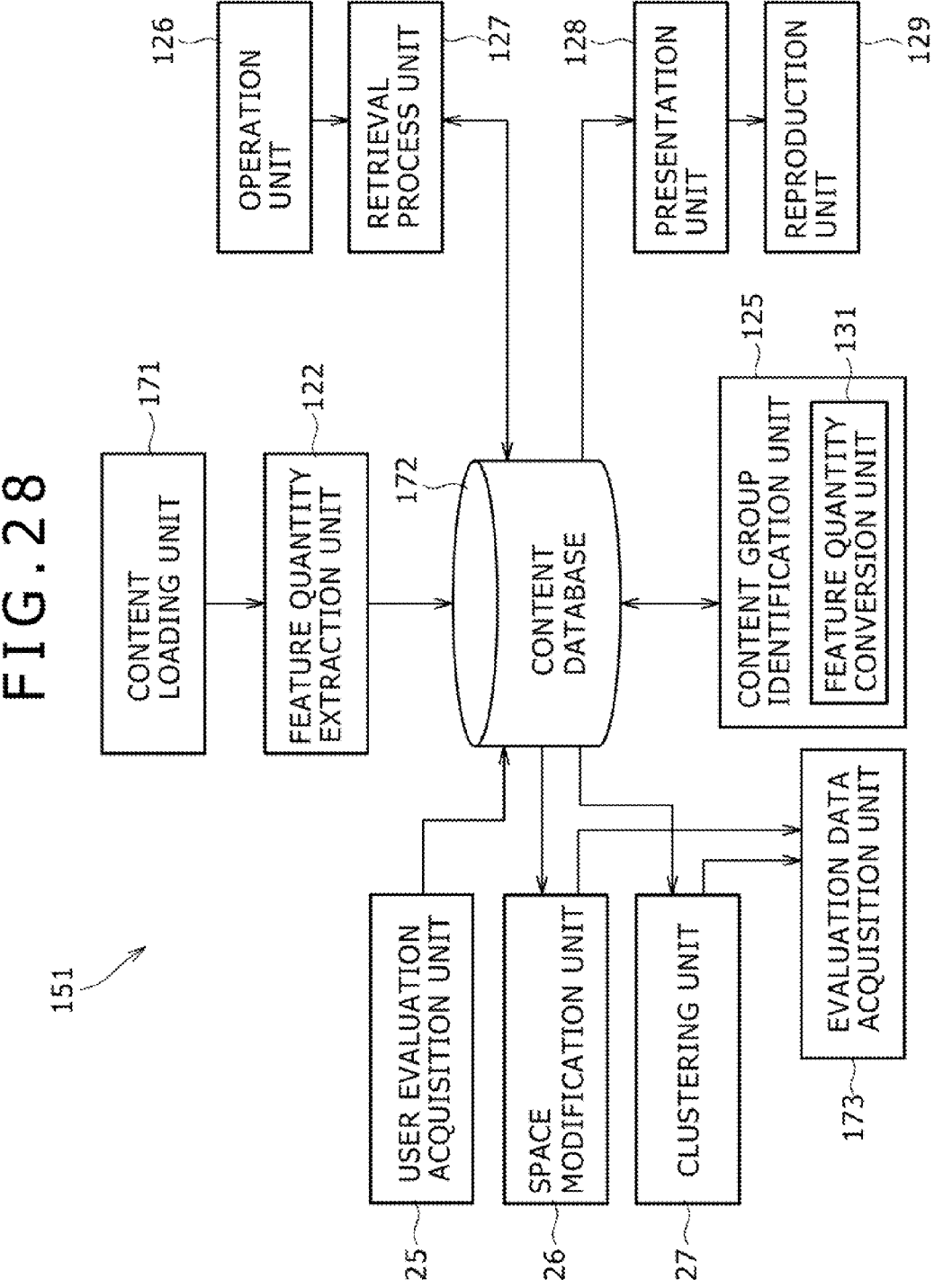
FIG. 28 is a block diagram illustrating a configuration example of an information processing apparatus operable to identify similar pieces of content by modifying a content feature quantity space.

FIG. 28 is a block diagram illustrating the configuration of an information processing apparatus 151 operable to modify a space by performing the preprocess described with reference to the flowchart in FIG. 23. The information processing apparatus 151 is also operable to identify similar pieces of content. In FIG. 28, like components as those in FIG. 1 are designated by the same numerals, and description thereof is omitted.

Further, in FIG. 28, like components as those in FIG. 25 are designated by the same numerals, and description thereof is omitted.

The information processing apparatus 151, whose configuration is illustrated in FIG. 28 and which is used by the user, includes the user evaluation acquisition unit 25, the space modification unit 26 and the clustering unit 27. The same apparatus 151 also includes the feature quantity extraction unit 122, the content group identification unit 125, the operation unit 126, the retrieval process unit 127, the presentation unit 128 and the reproduction unit 129, a content loading unit 171, a content database 172 and an evaluation data acquisition unit 173.

The content loading unit 171 loads sample content which serves as a content sample to modify a feature quantity space of sample content. The same unit 171 loads content, for example, by reading from a CD or downloading from a server via a network.

The content database 172 stores sample content, content, feature quantities of sample content or content and the similarity data S which is a user evaluation about sample content.

The evaluation data acquisition unit 173 acquires conversion functions from the space modification unit 26. The same unit 173 also acquires the centroid position from the clustering unit 27 and stores the conversion functions and the centroid position. The same unit 173 supplies the stored conversion functions and centroid position to the content group identification unit 125.

The preprocess performed by the information processing apparatus 151 is similar to that described with reference to the flowchart in FIG. 23, and therefore description thereof is omitted.

The content loading process performed by the same apparatus 151 is similar to that described with reference to the flowchart in FIG. 26, and therefore description thereof is omitted.

The similar content retrieval process performed by the same apparatus 151 is similar to that described with reference to the flowchart in FIG. 27, and therefore description thereof is omitted.

As described above, the information processing apparatus 151 operable to identify similar pieces of content modifies a feature quantity space, thus allowing conversion functions and centroid position to be found.

In this case, the similarity data S which is a user evaluation about sample content represents the subjective point of view of the user who uses the information processing apparatus 151. Therefore, the feature quantity space is modified according to the subjective point of view of the user who uses the same apparatus 151. As a result, content is clustered according to the same. This permits pieces of content to be retrieved which are perceived to be similar based on the analogy determination closer to the similarity determination according to the user's subjective point of view.

As described above, it will be possible to identify similar pieces of content in an easy, quicker and more accurate fashion.

When the distance between content feature quantities is used as a degree of similarity as in the related art, it has been necessary to recalculate the distance between feature quantities of a piece of content to be added and feature quantities of each of all the existing pieces of content every time an addition is made.

According to the present invention, however, a group of similar pieces of content is identified. As a result, it is only necessary to calculate the distance to a typical value for each piece of content, thus significantly reducing the processing load.

Further, to find the degree of similarity between pairs of pieces of content in the related art, it has been necessary to calculate the distance between features for all pairs every time an addition is made.

According to the present invention, however, a group is identified in advance. This eliminates the need to recalculate the distance between features for all pairs.

Alternatively, a space can be created to search for pieces of content in a similar genre. This can be accomplished by determining that pieces of content labeled to be in the same genre are similar to each other, and that those labeled to be in different genres are dissimilar to each other.

Similarly, for content which is musical pieces, a space can be created to search for musical pieces played with a similar combination of instruments. This can be accomplished by determining that musical pieces played with similar instruments are similar to each other, and that those played with mostly uncommon instruments are dissimilar to each other.

The present invention is applicable not only to content feature quantities but also to any case where the degree of similarity should be found between those having feature quantities for a given purpose. That is, the present invention permits determination of similarity not only between pieces of content but also between elements making up content. More specifically, the present invention is applicable, for example, to calculation of the degree of similarity between measures in the musical piece structure analysis.

It should be noted that the information processing apparatus 11 or 151 may extract content feature quantities by analyzing metadata attached to content. Alternatively, the same apparatus 11 or 151 may acquire existing content metadata as content feature quantities. In this case, metadata used may be numerical metadata or text metadata converted into numerical form by a method including the principal component analysis and the PLSA (Probabilistic Latent Semantic Analysis).

On the other hand, the information processing apparatus 101 or 151 was described as stationary equipment operable to record and reproduce content and identify similar pieces of content. However, the same apparatus 11 or 151 is not so limited, but need only be equipment operable to record and reproduce content. The same apparatus 11 or 151 may be configured as portable equipment, vehicle-mounted equipment or mobile phone.

As described above, when configured to retrieve similar pieces of content based on feature quantities, the information processing apparatus allows for identification of similar pieces of content. Further, when configured as described below, the information processing apparatus allows for identification of similar pieces of content in an easier, quicker and more accurate fashion. That is, the same apparatus converts content feature quantities using functions. The functions are adapted to convert a plurality of feature quantities attached to a plurality of pieces of content so that the distance between pieces of content defined by the plurality of feature quantities coincides with the distance suited for a user-entered similarity relationship between the plurality of pieces of content. The functions are further adapted to map the pieces of content laid out in a feature quantity space defined by the plurality of feature quantities into a new feature quantity space by the conversion of the plurality of feature quantities. The same apparatus retrieves similar pieces of content based on converted feature quantities.

A series of processes described above may be performed by hardware or software. When they are performed by software, a program making up the software is installed from a program recording medium into a computer built into dedicated hardware or a computer such as personal computer capable of performing various functionalities as various programs are installed.

FIG. 29 is a block diagram illustrating an example of configuration of a personal computer operable to perform the aforementioned processes. A CPU (Central Processing Unit) 201 performs various processes according to the program stored in a ROM (Read Only Memory) 202 or a storage unit 208. A RAM (Random Access Memory) 203 stores the program to be executed by the CPU 201 and data as appropriate. The CPU 201, the ROM 202 and the RAM 203 are connected with each other by a bus 204.

The CPU 201 also has an I/O interface 205 connected thereto via the bus 204. The I/O interface 205 has an input unit 206 and an output unit 207 connected thereto. The input unit 206 includes devices such as a keyboard, mouse and microphone. The output unit 207 includes devices such as a display and speaker. The CPU 201 carries out various processes in response to instructions from the input unit 206. The CPU 201 outputs the process results to the output unit 207.

The storage unit 208 connected to the I/O interface 205 includes, for example, a hard disk. The same unit 208 stores the program to be executed by the CPU 201 and various data. A communication unit 209 communicates with external equipment via a network such as the Internet or local area network.

Alternatively, the program may be acquired via the communication unit 209 and stored in the storage unit 208.

A drive 210 connected to the I/O interface 205 drives a removable medium 211 such as magnetic disk, optical disk, magneto-optical disk or semiconductor memory when the medium 211 is loaded. By doing so, the drive 210 acquires the program and data from the medium 211. The acquired program and data are transferred, as necessary, to the storage unit 208 for storage.

As illustrated in FIG. 29, a program recording medium operable to store a program installed into a computer and converted into executable form thereby includes the removable medium 211 which is a package medium and which includes a magnetic disk (including flexible disk), optical disk (including CD-ROM (Compact Disk-Read Only Memory), DVD (Digital Versatile Disk), magneto-optical disk) or a semiconductor memory. Alternatively, the program recording medium includes the ROM 202 which stores the program temporarily or permanently. Still alternatively, the program recording medium includes a hard disk which includes the storage unit 208, or other medium. Storage of the program in the program recording medium is accomplished, as necessary, via the communication unit 209 which is an interface such as router or modem. The program is stored using a wired or wireless communication medium such as a local area network, the Internet or digital satellite broadcasting.

It should be noted that, in the present specification, the steps describing the program stored in the program recording medium include not only processes performed chronologically according to the order given, but also other processes which are not necessarily performed in a chronological order, but which are rather performed in a parallel manner or on an individual basis.

It should be noted that the present invention is not limited to the aforementioned embodiments and may be modified in various ways within the spirit of the invention.

What is claimed is:

1. An information processing apparatus comprising:
    converting means for converting content feature quantities using functions adapted to convert a plurality of feature quantities attached to a plurality of pieces of content so that the distance between pieces of content defined by the plurality of feature quantities coincides with the distance suited for a user-entered similarity relationship between the plurality of pieces of content, the functions being further adapted to map the pieces of content laid out in a feature quantity space defined by the plurality of feature quantities into a new feature quantity space by the conversion of the plurality of feature quantities; and
    retrieval means for retrieving similar pieces of content based on converted feature quantities.

2. The information processing apparatus according to claim 1 further comprising
    extraction means for extracting content feature quantities.

3. The information processing apparatus according to claim 1, wherein
    the retrieval means retrieves similar pieces of content by retrieving pieces of content in the same group among those groups of content whose feature quantities have been converted by the functions.

4. The information processing apparatus according to claim 1, wherein
    the converting means converts content feature quantities by applying the functions obtained by repeated generation through a genetic method until an evaluation value is no longer updated a predetermined number of generations, the evaluation value being an information criterion calculated from two values, one of which is a value representing the degree of classification based on Euclidean distance between pieces of content considered to be similar and dissimilar in the user-entered similarity relationship between the plurality of pieces of content, and the other of which is the number of free parameters of the functions.

5. The information processing apparatus according to claim 4, wherein
    the converting means converts content feature quantities by applying the functions obtained by repeated generation through a genetic method until the evaluation value is no longer updated a predetermined number of generations, the evaluation value being calculated from an FDR (Fisher discriminant ratio) which represents the degree of classification.

6. The information processing apparatus according to claim 1 further comprising
    generation means for generating the functions through a generic method, wherein
    the converting means converts content feature quantities by applying the generated functions.

7. The information processing apparatus according to claim 6 further comprising
    calculation means for calculating an evaluation value, which is an information criterion, from two values, one of which is a value representing the degree of classification based on Euclidean distance between pieces of content considered to be similar and dissimilar in the user-entered similarity relationship between the plurality of pieces of content, and the other of which is the number of free parameters of the functions, and wherein
    the generation means generates the functions through a genetic method until the evaluation value is no longer updated a predetermined number of generations.

8. The information processing apparatus according to claim 7, wherein
    the calculation means calculates the evaluation value from an FDR which represents the degree of classification.

9. The information processing apparatus according to claim 7 further comprising
    acquisition means for acquiring data representing a user-entered similarity relationship between the plurality of pieces of content, wherein
    the calculation means calculates an evaluation value using the data representing the user-entered similarity relationship between the plurality of pieces of content.

10. The information processing apparatus according to claim 1 further comprising
    clustering means for performing clustering of content based on converted feature quantities.

11. The information processing apparatus according to claim 1 further comprising
    identification means for identifying a group to which content belongs from a content-to-cluster distance based on converted feature quantities.

12. An information processing method comprising the steps of converting and retrieving, wherein
    the converting step converts content feature quantities using functions adapted to convert a plurality of feature quantities attached to a plurality of pieces of content so that the distance between pieces of content defined by the plurality of feature quantities coincides with the distance suited for a user-entered similarity relationship between the plurality of pieces of content, the functions being further adapted to map the pieces of content laid out in a feature quantity space defined by the plurality of feature quantities into a new feature quantity space by the conversion of the plurality of feature quantities, and wherein
    the retrieval step retrieves similar pieces of content based on converted feature quantities.

13. A program causing a computer to execute the steps of converting and retrieving, wherein
    the converting step converts content feature quantities using functions adapted to convert a plurality of feature quantities attached to a plurality of pieces of content so that the distance between pieces of content defined by the plurality of feature quantities coincides with the distance suited for a user-entered similarity relationship between the plurality of pieces of content, the functions being further adapted to map the pieces of content laid out in a feature quantity space defined by the plurality of feature quantities into a new feature quantity space by the conversion of the plurality of feature quantities, and wherein
    the retrieval step retrieves similar pieces of content based on converted feature quantities.

14. A recording medium for storing a program causing a computer to execute the steps of converting and retrieving, wherein
    the converting step converts content feature quantities using functions adapted to convert a plurality of feature quantities attached to a plurality of pieces of content so that the distance between pieces of content defined by the plurality of feature quantities coincides with the distance suited for a user-entered similarity relationship between the plurality of pieces of content, the functions being further adapted to map the pieces of content laid out in a feature quantity space defined by the plurality of feature quantities into a new feature quantity space by the conversion of the plurality of feature quantities, and wherein the retrieval step retrieves similar pieces of content based on converted feature quantities.

15. An information processing apparatus comprising:

a converting section configured to convert content feature quantities using functions adapted to convert a plurality of feature quantities attached to a plurality of pieces of content so that the distance between pieces of content defined by the plurality of feature quantities coincides with the distance suited for a user-entered similarity relationship between the plurality of pieces of content, the functions being further adapted to map the pieces of content laid out in a feature quantity space defined by the plurality of feature quantities into a new feature quantity space by the conversion of the plurality of feature quantities; and a retrieval section configured to retrieve similar pieces of content based on converted feature quantities.

* * * * *